(12) United States Patent
Simic et al.

(10) Patent No.: US 8,213,487 B2
(45) Date of Patent: *Jul. 3, 2012

(54) SYSTEMS, METHODS, AND APPARATUS FOR JAMMER REJECTION

(75) Inventors: Emilija Simic, La Jolla, CA (US); Douglas Neal Rowitch, Del Mar, CA (US); Christopher Patrick, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/843,605

(22) Filed: Jul. 26, 2010

(65) Prior Publication Data

US 2010/0316095 A1  Dec. 16, 2010

Related U.S. Application Data

(63) Continuation of application No. 11/291,173, filed on Nov. 30, 2005, now Pat. No. 7,764,726.

(60) Provisional application No. 60/632,510, filed on Dec. 1, 2004.

(51) Int. Cl.
 *H04B 1/00* (2006.01)
(52) U.S. Cl. ...................................... 375/150
(58) Field of Classification Search ................. None
 See application file for complete search history.

(56) References Cited

U.S. PATENT DOCUMENTS

| | | | |
|---|---|---|---|
| 4,701,934 A | 10/1987 | Jasper | |
| 5,663,734 A | 9/1997 | Krasner | |
| 6,044,104 A | 3/2000 | Watanabe | |
| 6,366,599 B1 | 4/2002 | Carlson et al. | |
| 6,633,255 B2 | 10/2003 | Krasner | |
| 7,069,019 B2* | 6/2006 | Sahai et al. | 455/456.1 |
| 2002/0064210 A1 | 5/2002 | Sullivan | |
| 2003/0081662 A1 | 5/2003 | Rick et al. | |
| 2003/0128747 A1 | 7/2003 | Poon et al. | |
| 2003/0193992 A1 | 10/2003 | Challa et al. | |
| 2004/0042568 A1 | 3/2004 | Rowitch | |
| 2004/0078140 A1 | 4/2004 | Rowitch et al. | |

(Continued)

FOREIGN PATENT DOCUMENTS

JP  6252887  9/1994

(Continued)

OTHER PUBLICATIONS

Asai et al.,: "A Speed-Enhanced Method for GPS Satellite Tracking Processing with a 32-Bit Integration-Type Processor," Technical Journal B of the Institute of Electronics, Information and Communication Engineers, IEICE, Nov. 25, 1999, vol. J82-B, No. 11, pp. 2051-2060.

(Continued)

*Primary Examiner* — Khanh C Tran
(74) *Attorney, Agent, or Firm* — Liberty E. Mann

(57) ABSTRACT

A method according to an embodiment obtains a list of peaks for each of a number of frequency hypotheses. Each peak has an energy result and corresponds to a code phase hypothesis. Embodiments include methods and apparatus that may be used in identifying a location of a signal (such as a GPS signal) in a two-dimensional search space. Location information may be further applied to operations such as signal acquisition, signal tracking, position location of a receiver, and timing operations such as the synchronization of one or more other processes.

28 Claims, 24 Drawing Sheets

U.S. PATENT DOCUMENTS

2004/0141574 A1 7/2004 Akopian
2004/0196183 A1 10/2004 Roh

FOREIGN PATENT DOCUMENTS

| JP | 2001237744 | | 8/2001 |
|----|------------|----|--------|
| JP | 2003518806 | | 6/2003 |
| JP | 2003258681 | | 9/2003 |
| JP | 2005201814 | | 7/2005 |
| WO | WO2004005954 | | 1/2004 |
| WO | WO2004034077 | A2 | 4/2004 |

OTHER PUBLICATIONS

International Search Report and Written Opinion—PCT/US2005/043529, International Search Authority—European Patent Office—Aug. 23, 2006.

Murayama, et al., "A Fast Algorithm for Calculating Correlation in FFT Based GPS Receiver with Carrier Frequency Deviation," Technical Report of the Institute of Electronics, Information and Communication Engineers, IEICE, Jul. 10, 2003, pp. 39-44.

* cited by examiner

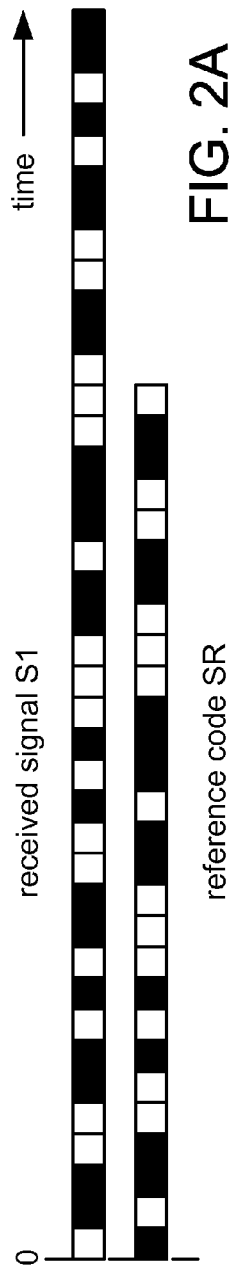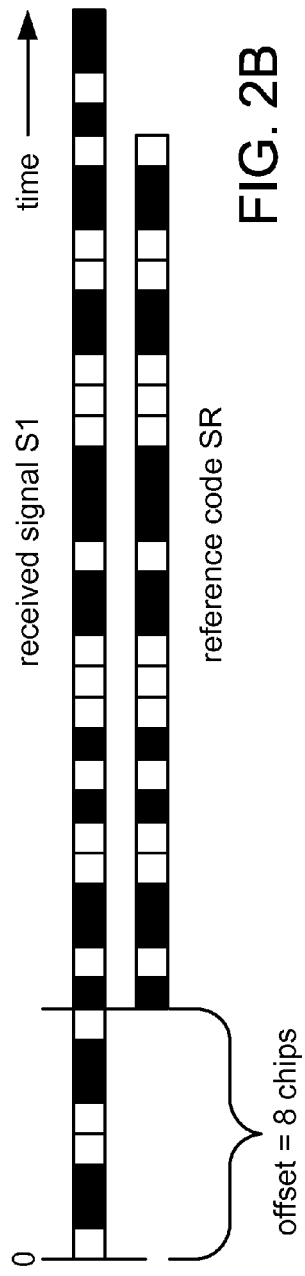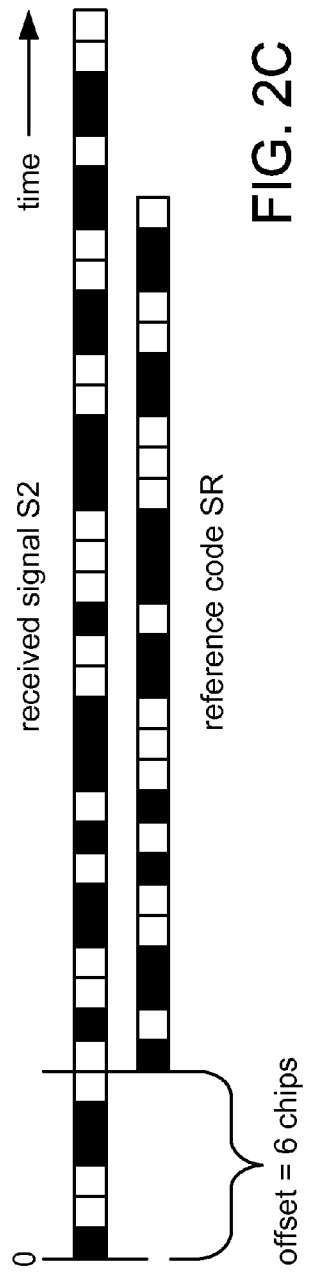

SYSTEMS, METHODS, AND APPARATUS FOR JAMMER REJECTION

RELATED APPLICATIONS

This application is a continuation of U.S. patent application Ser. No. 11/291,173, entitled "Systems, Methods, and Apparatus for Jammer Rejection", filed Nov. 30, 2005, issued as U.S. Pat. No. 7,764,726 on Jul. 27, 2010, which claims benefit of U.S. Provisional Patent Application No. 60/632,510, filed Dec. 1, 2004.

FIELD OF THE INVENTION

This invention relates to wireless signal reception.

BACKGROUND

One example of a system for radio-location and time transfer is the NAVSTAR Global Positioning System (GPS) as described in the Global Positioning Service Signal Specification ($2^{nd}$ ed., 1995, USCG Navigation Center, Alexandria, Va.). Other examples include the GLONASS GPS maintained by the Russian Republic and the GALILEO system proposed in Europe. Typical uses for radio-location systems include airborne and oceanic navigation, although other uses for such systems are becoming increasingly common Ground-based systems such as networks for cellular telephony may also be used for radio-location and time transfer. Examples of terrestrial applications for radio-location technologies include asset tracking (for example, tracking of trucks and railcars), time transfer (for example, between fixed and mobile units of a cellular telephone network), locating cellular telephone users for emergency services (for example, as part of an "enhanced 911" initiative), and highway navigation assistance.

The NAVSTAR GPS includes a set of satellites or "space vehicles" (SVs) that transmit navigation messages on a 1.57542-GHz carrier (also called the L1 frequency). The navigation messages are transmitted at a data rate of 50 bits per second via a direct sequence spread spectrum (DSSS) signal that is BPSK (binary phase-shift-keying) modulated onto the carrier. To spread the signal, each SV uses a different one of a set of pseudo-random noise (PRN or PN) codes, which are also called "coarse acquisition" or C/A codes. Each C/A code has a chip rate of 1.023 MHz and a length of 1023 chips, such that the code repeats every one millisecond. The C/A codes are Gold codes which are selected for their autocorrelation properties. FIG. 1 shows a portion of the autocorrelation function of GPS PRN 1, which has a magnitude below 0.1 for all code offsets from +1 to +511 and from −1 to −511.

A NAVSTAR GPS SV may also transmit messages via a 10.23 MHz P(Y) code modulated onto a carrier at 1.22760 GHz (also called the L2 frequency). A GPS SV may transmit messages in a similar manner via several other carriers and/or codes as well. One common use of GPS signals is to support position location operations by terrestrial receivers. Typically, signals from at least four SVs are needed to resolve a position in three dimensions.

A GPS signal as received by a terrestrial user is exceedingly weak. For example, the received power of a GPS signal at the earth's surface is −130 dBm. In contrast, the thermal noise level is −111 dBm, or nearly 20 dB higher. A receiver inside a building may be expected to experience an additional 20 dB of signal attenuation from concrete and other building materials, such that a GPS signal received indoors may be about 40 dB below the thermal noise level. In these circumstances, an interfering signal well below the thermal noise level may be sufficient to prevent a GPS receiver from detecting a valid signal, despite the strong autocorrelation properties of the C/A codes.

SUMMARY

A method of signal processing according to one embodiment includes obtaining a plurality of results based on correlating a received code with a reference code. Each of the results corresponds to one of a plurality of code phase hypotheses and one of a plurality of frequency hypotheses. For each of the plurality of the frequency hypotheses, the method includes selecting a plurality of peaks among the results for the frequency hypothesis. For each of the plurality of the frequency hypotheses, the method includes storing a list of the selected plurality of peaks. Further embodiments include rejecting a frequency hypothesis based on the corresponding list. In one example, the received code is obtained from a signal received from a GPS SV.

An apparatus according to another embodiment includes a first array of logic elements configured to obtain a plurality of results based on correlating a received code with a reference code. Each result corresponds to one of a plurality of code phase hypotheses and one of a plurality of frequency hypotheses. The apparatus also includes a second array of logic elements configured to select, for each of a plurality of the frequency hypotheses, a plurality of peaks among the results for the frequency hypothesis and to store a sorted list of the selected plurality of peaks.

BRIEF DESCRIPTION OF THE DRAWINGS

Unless stated otherwise in the text, like reference numerals refer to like structures throughout.

FIGS. 2A-2C show comparisons of received codes with a reference code.

DETAILED DESCRIPTION

Figure 1:
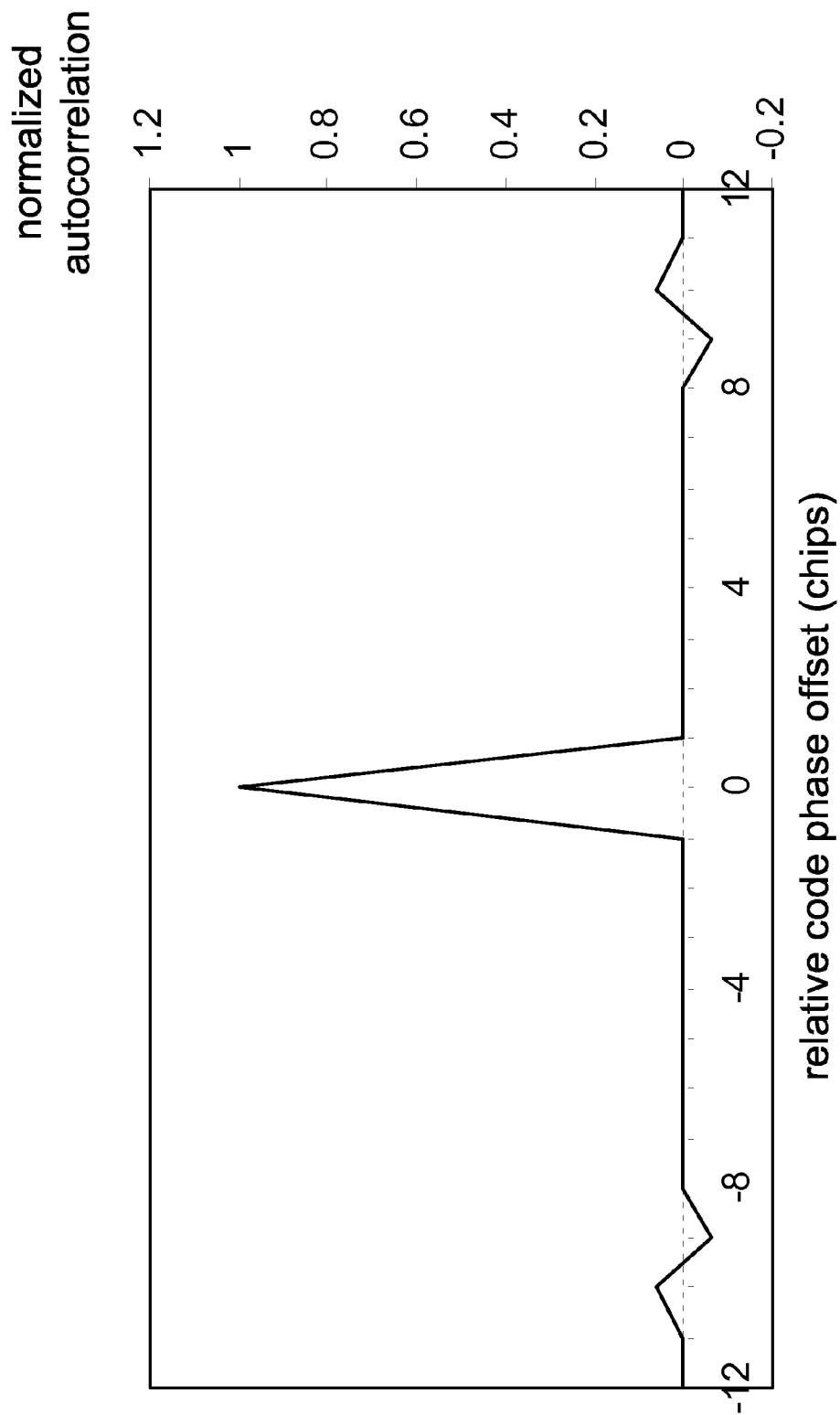
FIG. 1 is a plot showing a portion of the autocorrelation function of a GPS C/A code.

As used herein, the term "obtaining" includes such ordinary meanings as calculating, deriving, and/or retrieving (e.g. from a memory or other storage or from another device).

Embodiments include methods and apparatus that may be used in identifying a location of a signal in a two-dimensional search space. Such uses may include identifying a code phase and frequency of a received signal. The identified information may be further applied to operations such as acquisition and/or tracking of the signal. Code phase information may also be used in timing operations, such as the synchronization of one or more other processes.

A receiving device according to an embodiment may be configured to receive signals from one or more of a system of positioning satellites, such as the NAVSTAR GPS. Additionally or alternatively, a receiving device according to an embodiment may be configured to receive and/or transmit information (e.g. voice and/or data) over a network for wireless communications. Such a device may be configured to receive and/or transmit information via one or more channels in a code-division-multiple-access (CDMA) system. For example, a receiving device according to an embodiment may perform some or all of the functions of a subscriber unit, access terminal (AT), base transceiver station (BTS), and/or user equipment (UE) according to at least a portion of one or more of the following standards or formats as promulgated by TIA, EIA, 3GPP, 3GPP2, CWTS (China), ARIB (Japan), TTC (Japan), TTA (Korea), ITU, and/or ETSI (Europe): CDMA, TD-SCDMA, W-CDMA (e.g. 3G TS 25.211/2/3/4), UMTS, IS-95-A/B/C (cdmaOne), IS-98, IS-835-A (cdma2000), IS-856 (cdma2000 HDR), IS-2000.1-A and other documents of the IS-2000 series (cdma2000), IS-707-A (data services), cdma2000 1xEV, cdma2000 1x EV-DO, cdma2000 1x EV-DV (also called 1x-EV phase 2), cdma2000 3x, 3GPP2 cdma2000 (e.g. TR-45.5, C.S0005-A, C.S0024), and IMT-2000. Such a receiver or transceiver may be configured to communicate over bands at or near, e.g., 800 MHz, 1800 MHz, and/or 1900 MHz. Such a receiver or transceiver may be configured to communicate via, for example, an M-ary form of phase-shift keying (PSK) such as binary PSK (BPSK), quadrature PSK (QPSK), offset QPSK (OQPSK), quadrature amplitude modulation (QAM), offset QAM (OQAM), minimum-shift keying (MSK), or Gaussian MSK (GMSK).

Methods for radio-location and/or time transfer include receiving a signal that has a predetermined code (i.e. a sequence of symbols), such as a GPS or CDMA signal. The predetermined code may be a repeating code, such as a GPS C/A code. Alternatively, the predetermined code may be a code that does not repeat or that has a very long period, such as a GPS P(Y) code. In many applications the original code will be a sequence of binary symbols such as +1 and −1 (as in a GPS C/A code), although such a code as received may include values ranging from one of the symbol values to the other. For example, the received code may have a complex value, with each component having a value that ranges from one symbol value to the other (e.g. from about +1 to −1). At least some embodiments may also be applied to situations in which the original code is not a binary sequence.

It may be desirable for the predetermined code to be a pseudonoise (PN) sequence or to otherwise have a noise-like autocorrelation property (for example, as shown in FIG. 1), such that correlation of the code as received with a reference copy of the code may be expected to yield a well-defined peak. The received signal may also be data-modulated. For example, the received signal may be a spread spectrum signal in which the predetermined code is used to spread the bandwidth of a data stream, with the spread data stream then being used to modulate a carrier (via, for example, a PSK modulation).

The description herein refers primarily to examples of application to a C/A code on a GPS L1 carrier, and embodiments include systems, methods, and apparatus that receive and process such codes. However, embodiments also include systems, methods, and apparatus that operate on other codes instead, and systems, methods, and apparatus that operate on these codes as well as others (e.g. GPS P(Y) codes and/or CDMA PN codes). Thus the range of embodiments is not limited to this particular application or to these particular predetermined codes. Other signals to which embodiments may be adapted include GPS L1 M, L1 P/Y, L2 Civil, L2 P/Y, L2 M, and/or L5 Civil. Principles described herein may also be applied to reception of transmissions including a data signal and a pilot signal (e.g. GPS L5, Galileo E5a and/or E5b).

FIG. 2A shows an example of a comparison between a predetermined code S1 as received (beginning at time index 0) and a reference copy SR of the code (hereinafter referred to as the "reference code"). In this example, filled squares indicate one binary symbol (e.g. +1) and open squares indicate the other binary symbol (e.g. −1). It may be seen that in the example of FIG. 2A, the two codes are not aligned.

In FIG. 2B, the reference code SR is shifted to an offset of eight chips with respect to time index 0. With the reference code in this position, the two codes are now aligned. The offset between the code as received and the reference code, when the reference code is in a position such that the two codes are aligned, is called the code phase of the signal. Thus, the received code S1 has a code phase of eight chips.

FIG. 2C shows an example of an alignment between the reference code and another received code S2, which has a code phase of six chips. In this example, the received signal carrying code S2 has also been data-modulated, such that the symbols of the received code S2 over the code period are inverted as compared with those of the reference code.

The code phase may be used as an indication of the delay of the received signal, which in turn may be used as a measure of the distance between transmitter and receiver. Additionally or alternatively, the code phase may be used in synchronizing operations relating to the reception and/or transmission of one or more other signals. For example, timing information derived from the code phase may be used to synchronize the receiver to a slotted access channel. Examples of a slotted access channel include an access channel, which may be transmitted by the transmitter of the received code (e.g. on a downlink or reverse link), and a paging channel, which may be monitored by a receiver at that location (e.g. on an uplink or forward link).

Correlation of the received code sequence with the reference code may be performed in the time domain by integrating the product of the received and reference codes over some portion of the length of the reference code:

$$y(t) = \int_{k=0}^{N-1} x(t+k)r(k), \quad (1)$$

where x is the received code, r is the reference code of length N, and y(t) is the correlation result at offset t. Typically, the received code will be a complex baseband signal, such that the correlation is performed for each of the I and Q components of the received code.

Alternatively, a correlation result of the received signal and reference code for a given offset may be obtained by convolving the signal with, for example, a matched filter of the complex reference code r+jr (i.e. a filter having an impulse response that is the time-reversed complex conjugate of the reference code):

$$y(t) = \int_{k=0}^{N-1} r^*(N-1-k)x(t-k), \quad (2)$$

where $r^* = r - jr$ is the complex conjugate of the complex reference code.

For a GPS C/A code, the results of expressions (1) and (2) over a range of offsets will have the shape of a sinc function. While correlation results obtained using either expression (and/or another expression of the degree of correlation of the two codes) may be used as an energy result for the corresponding offset, typically the energy result is calculated as the sum of the squares of such correlation results for the I and Q components. The result of such a calculation over a range of offsets will have the shape of a (sinc)² function, whose peak is sharper and thus more localized than that of a sinc function.

As the energy calculation operation is typically performed on a sampled received signal, the operations described in expressions (1) and (2) and an energy calculation operation at offset t may be expressed in discrete time as:

$$y(t) = \sum_{k=0}^{N-1} x(t+k)r(k), \quad (3)$$

$$y(t) = \sum_{k=0}^{N-1} r^*(N-1-k)x(t-k), \quad (4)$$

$$e(t) = \left[\sum_{k=0}^{N-1} x_I(t+k)r(k)\right]^2 + \left[\sum_{k=0}^{N-1} x_Q(t+k)r(k)\right]^2, \quad (5)$$

respectively, where $x_I$ is the in-phase component of the received code, $x_Q$ is the quadrature component of the received code, and e(t) is the energy result at offset t.

Depending on the particular design, the energy results may be fixed-point or floating-point values, and they may be in arbitrary units, e.g. in a case where the energy results are used only to determine relative differences between the peaks. In a case where an energy result may also be used for one or more other tasks (e.g. compared to other system parameters), the measurement scale may be selected as appropriate for such a task or tasks.

Figure 3:
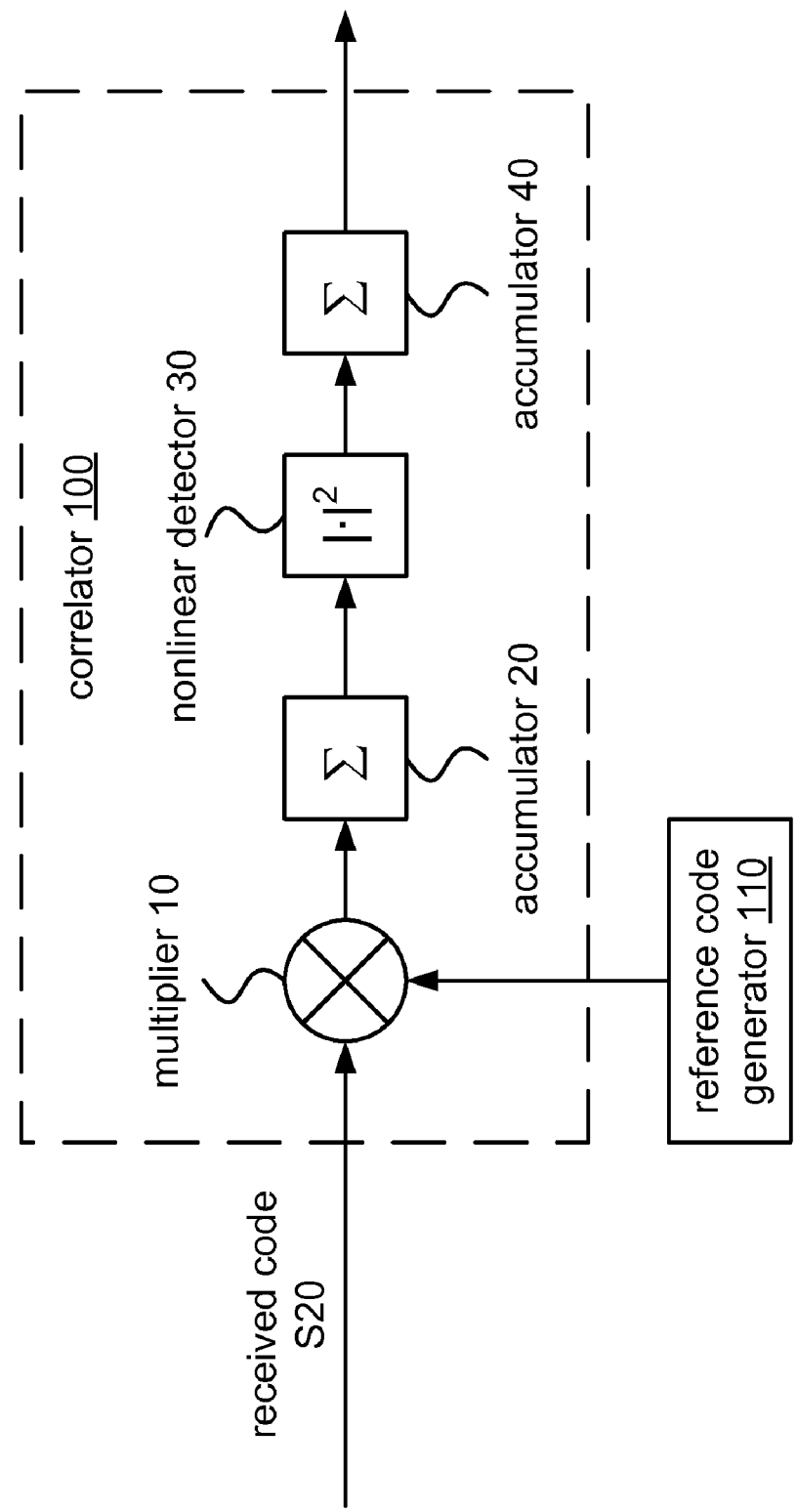
FIG. 3 shows a block diagram of one example of a correlator 100 and a reference code generator 110.

FIG. 3 shows a block diagram of one example of a correlator 100 that may be used to obtain energy results. Multiplier 10 multiplies the complex received code S20 with the reference code, and accumulator 20 accumulates the products over the length of the reference code. Nonlinear detector 30, which may be implemented as a squarer, obtains the squared sum for each component, and accumulator 40 adds the squared sums to obtain the energy result. Reference code generator 110, which may be implemented as a shift register such as a linear feedback shift register (LFSR), is clocked according to the chip rate of the received code or some derivative thereof. Alternatively, the reference code may be read from storage at an appropriate rate or received from an external device or circuit.

Although the example of FIG. 3 shows a serial correlator, correlator 100 may also be implemented to perform parallel correlation (multiplying more than one bit of the codes at the same time) or any combination of serial and parallel operation. A GPS receiver may include multiple instances of correlator 100, each receiving a copy of the reference code having a different corresponding delay, to obtain results for more than one code phase hypothesis at a time. Multiple instances of correlator 100 may also be used to search on more than one reference code at a time. A module including one or more correlators and logic (e.g. a processor) configured to control the correlators to obtain energy results for a desired set of hypotheses may be called a searcher or a means for searching.

In contrast to the idealized examples in FIGS. 2A-2C, symbols of a code as received may be somewhat ambiguous. Nevertheless, the complexity of the correlation and/or energy calculations may be reduced somewhat according to the nature of the reference code and the criteria of the particular application. In a GPS C/A code application, for example, the result of multiplying a received symbol with a reference code symbol is either the received symbol or its inverse. If the associated loss in signal-to-noise ratio is acceptable, the received symbol may even be classified as +1 or −1, such that the multiplication may be reduced to an XOR operation. Embodiments include systems, methods, and apparatus that employ these and similar optimizations.

Calculation of an energy result as described above may be repeated for each offset (or "code phase hypothesis") to be considered. In the GPS C/A code phase circle, there are 1023 possible hypotheses (or 2046 hypotheses at a resolution of ½ chip). In many cases, however, the number of hypotheses to be searched may be greatly reduced by applying knowledge of the code phase location of the received code as obtained from previous searches and/or from an external source (such as a position determination entity or PDE). In such an implementation, the search may be reduced to a width of, for example, 256 chips or 32 chips or less.

Alternatively, correlation and/or energy results for the various code phase hypotheses may be obtained via operations in the frequency domain. The entire code phase circle may be efficiently searched at a selected resolution by, for example, transforming the received code into the frequency domain (e.g. using a discrete Fourier transform (DFT) operation such as a fast Fourier transform (FFT)), multiplying the transformed signal with a matched filter of the reference code, and applying an inverse transform to obtain the corresponding results in the time domain. Some frequency-domain correlation techniques may also be used to perform a more narrow search in the frequency domain. For example, U.S. Published Patent Application No. 2004/0141574 (Akopian, published Jul. 22, 2004) purports to describe a frequency-domain method for searching over a limited range of code phases.

As for calculations in the time domain, it may be desired in frequency-domain implementations to include multiple instances of an appropriate correlator (e.g. a set of logic elements, such as transistors and/or gates, programmed or otherwise arranged to perform FFT, IFFT, and associated operations) to support searching for more than one reference code at a time. It may also be desirable to perform the transform of the reference code in advance and store the result in memory (e.g. in nonvolatile memory).

In addition to locating the received code in the code phase dimension, it may also be desirable for a receiving device to determine the signal's location in frequency space. Relative motion between a receiver and a transmission source (and/or apparent motion between the two, as might be caused by a moving reflector) causes a Doppler frequency error at the receiver that can be expressed in Hertz as $vf/c \cos \phi$, where v is the apparent relative velocity of the receiver and source, f is the carrier frequency in Hertz, c is the speed of light, and $\phi$ is the angle between the direction of travel of the receiver and the direction from the receiver to the transmission source. If the receiver is traveling directly toward the source, then $\phi=0$, and if the receiver is traveling directly away from the source, then $\phi=\pi$ radians.

For a typical terrestrial GPS user, the Doppler shift due to the combined movement of the SV and user relative to one another amounts to about +/−2.7 ppm. Frequency error of one or more oscillators at the receiver may add about another 2 ppm, for a total of 4.7 ppm of frequency uncertainty (alternatively, local oscillator error may be corrected at least somewhat, e.g. with a PLL or other correction loop). This 4.7 ppm corresponds to about +/−7.5 kHz at the L1 carrier frequency of 1.57542 GHz. Filters may be used to remove frequency components outside that range.

In addition to searching for the signal in code space, therefore, a receiving device may also search for the signal in frequency space. Many techniques and corresponding correlator and searcher structures may be used to obtain search results in two dimensions using operations in the time domain and/or in the frequency domain. In one example, correlation is performed in the time domain for a particular code phase hypothesis, and the result is transformed to the frequency domain (e.g. using a DFT or FFT) where the desired range of frequency hypotheses are searched for that code phase hypothesis. Such an operation may be repeated across the desired range of code phase hypotheses.

For received signals having very low levels (such as GPS signals), it may be desirable to accumulate the energy at a particular grid point using coherent integration. In the time domain, coherent integration may be accomplished by summing correlation or energy results over more than one consecutive code period of the received code, and in the frequency domain it may be performed by summing each of the frequency components over time.

Because the GPS C/A signal is modulated with data at a rate of 50 bits/second, coherent integration of the signal is typically limited to twenty milliseconds. If the data is known a priori, it may be removed from the signal (a process called data wipeoff or modulation wipeoff), and the coherent integration period may be extended to 40 milliseconds or even up to 160 milliseconds or more. Non-coherent integration may also be applied to combine results from non-consecutive code periods, or coherent integration periods, up to 88 or more times. In a communications device having an integrated GPS receiving device, the integration time may be limited by a maximum tune-away time relating to requirements of the communications channel.

Data transmitted on a GPS C/A signal is largely redundant, and data to support modulation wipeoff may be provided by an external unit such as a PDE. A PDE may provide related information such as which SVs are currently visible and their approximate code phases and Dopplers. A PDE may also be configured to request a GPS receiving device to initiate a search. Communication between a GPS receiving device and a PDE may take place over a network for cellular communications (for example, via a cellular telephone transceiver with which a GPS receiver is integrated).

The spacings and ranges of the code and/or frequency hypotheses may be varied based on factors such as strength of the desired SV signal, interfering signal strength, range of code phase and frequency uncertainty, desired accuracy, desired probability of detection, and desired time-to-fix. Typical code phase spacings include 1 chip, ½ chip, and ¼ chip. Typical frequency ranges include +/−31.25 Hz, 62.5 Hz, 125 Hz, and 250 Hz, with the range being divided into e.g. twenty frequency bins. Smearing of received energy across two or more code phase and/or frequency bins may occur if the integration period is too long. Smearing of received energy across two or more frequency bins may also occur if the spacing in the frequency domain is too narrow.

A receiving device (or a searcher within such a device) may be configured to perform searches according to a selectable one of several different search modes distinguished by such characteristics as frequency spacing and integration lengths. For example, a search operation may include a low-resolution, wide-range search followed by one or more searches at a finer resolution. Searching may be performed for initial code acquisition, with subsequent tracking being done using a timing loop. In other applications, acquisition of the code may be sufficient. Whether within the receiving device or in another unit that is in communication with the device (such as a PDE), the code phase of the received code may be used to derive a measurement of time-of-arrival of the received code (or "pseudorange"), and pseudoranges from several SVs may be combined to obtain a position in space.

A received signal may carry more than one code. For example, at any location on the earth's surface there may be up to twelve different GPS SVs visible, such that a GPS signal as received may include codes transmitted by more than one SV. A GPS receiving device will typically search for four, eight, or more SVs at once. Such searches, which may be performed on the same portion of a received signal, may be conducted serially and/or in parallel.

Figure 4:
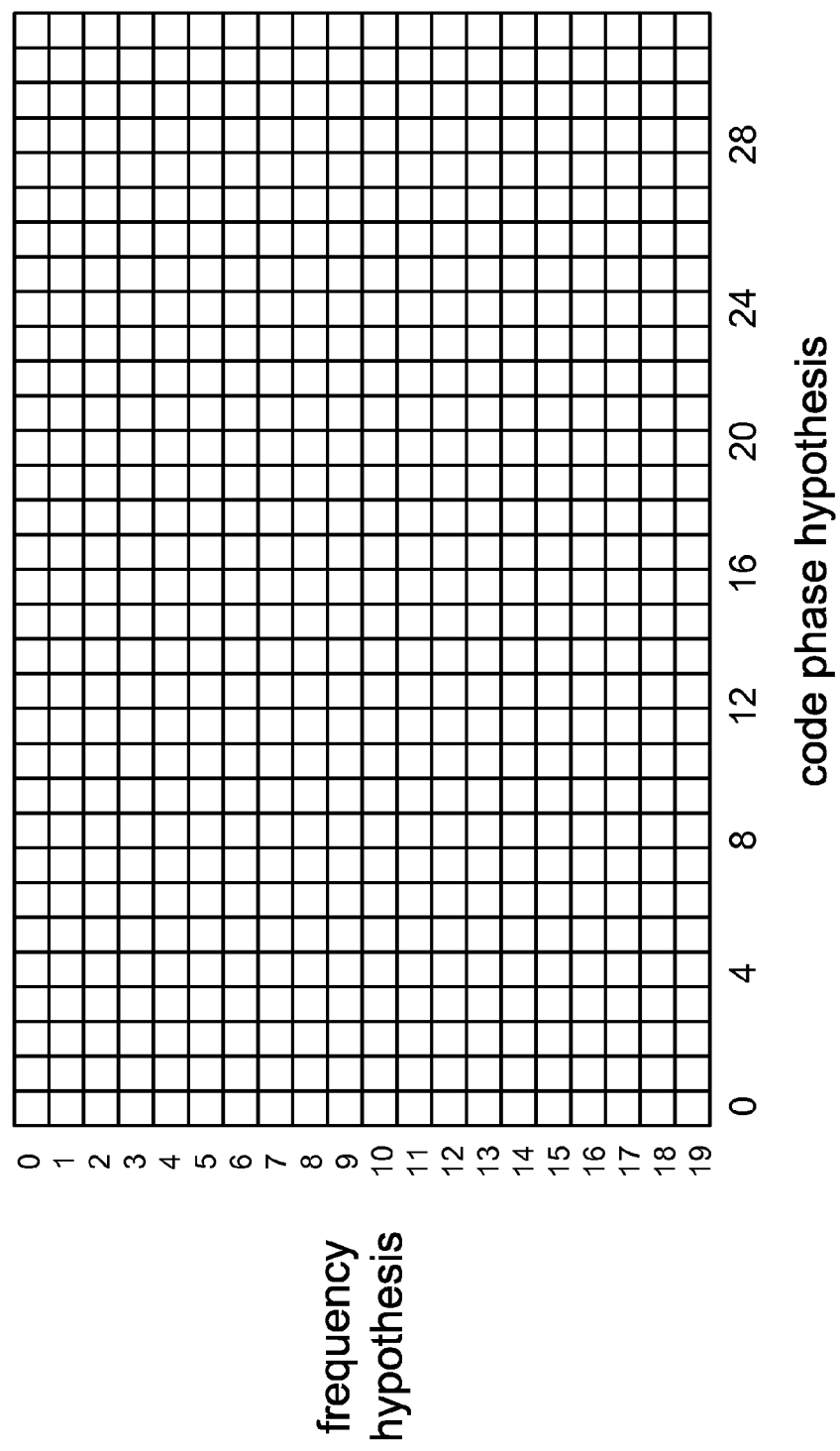
FIG. 4 is a block diagram showing a two-dimensional search window.

FIG. 4 shows an example of a search window that extends across twenty hypotheses in the frequency dimension and 32 hypotheses in the code phase dimension. Selection of the particular location and/or spacing of the hypotheses of each dimension of the search window may be guided by information obtained externally and/or from one or more previous searches. For example, it may be known or estimated that the desired signal lies within a certain number of chips from a given code phase, and/or that the signal may be found within a certain bandwidth around a given frequency, such that the search window may be defined accordingly. In a case where searches are to be conducted for more than one code, the corresponding search windows need not have the same dimensions.

A search may be conducted (for example, according to a search window of D frequency hypotheses by C code hypotheses) to obtain a grid of D×C energy results, each result corresponding to one of the D frequency hypotheses and one of the C code hypotheses. We refer to the set of energy results that correspond to the code phase hypotheses for a particular frequency hypothesis as a "Doppler bin."

Figure 5:
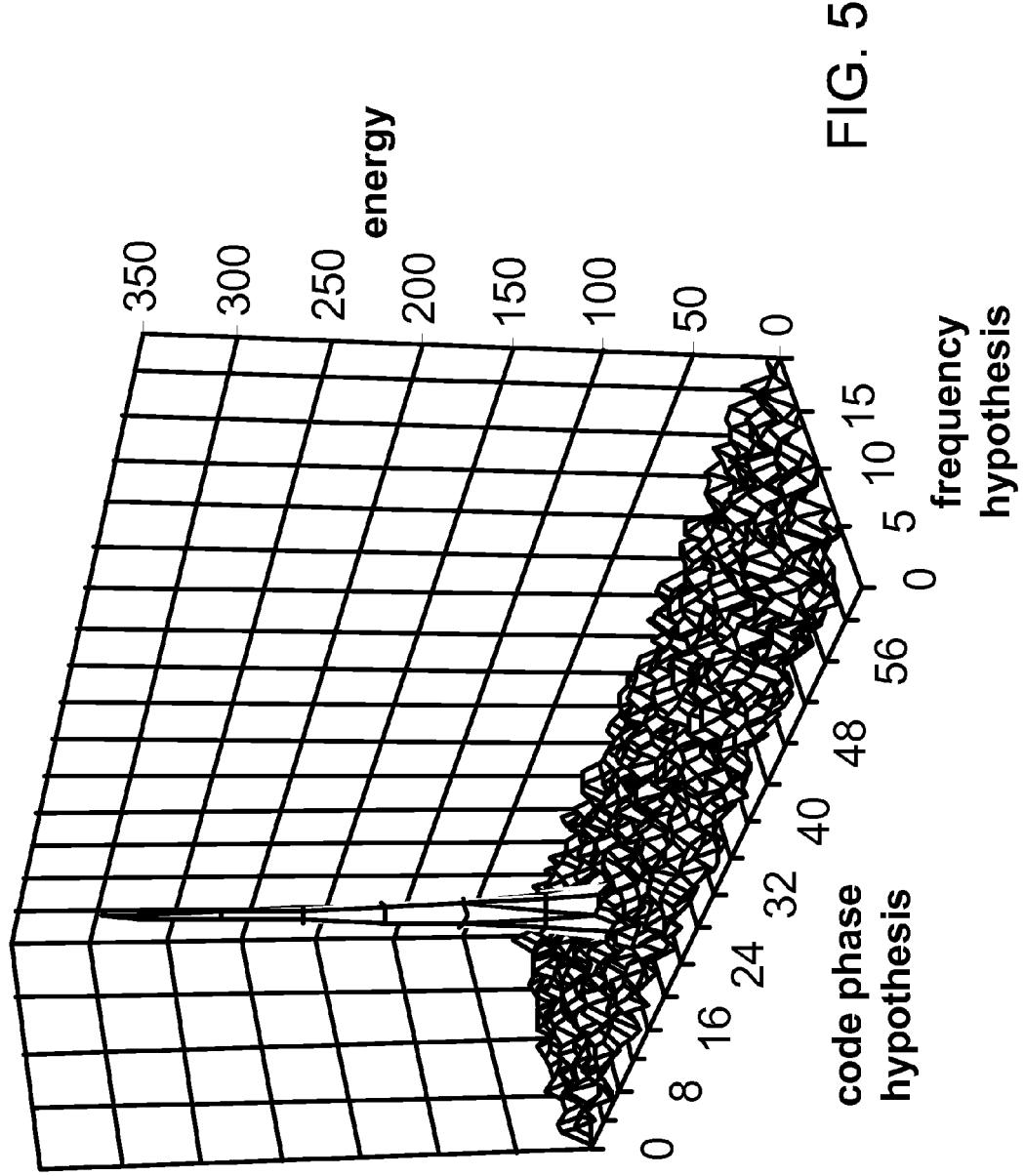
FIG. 5 is an energy plot showing a peak as may be obtained from a line-of-sight signal.

FIG. 5 shows an example of a peak within an energy grid of twenty Doppler bins, each bin having 64 code hypotheses. In this example, adjacent code phase hypotheses are ½-chip apart, such that the grid extends across 32 chips in code space. The energy peak in this figure indicates the presence of the selected SV signal at code phase hypothesis 16 in Doppler bin 10. A GPS receiving device (or a searcher within such a device) may produce energy grids for several different corresponding SVs from the same portion of a received signal, with the grids possibly having different dimensions.

Figure 6:
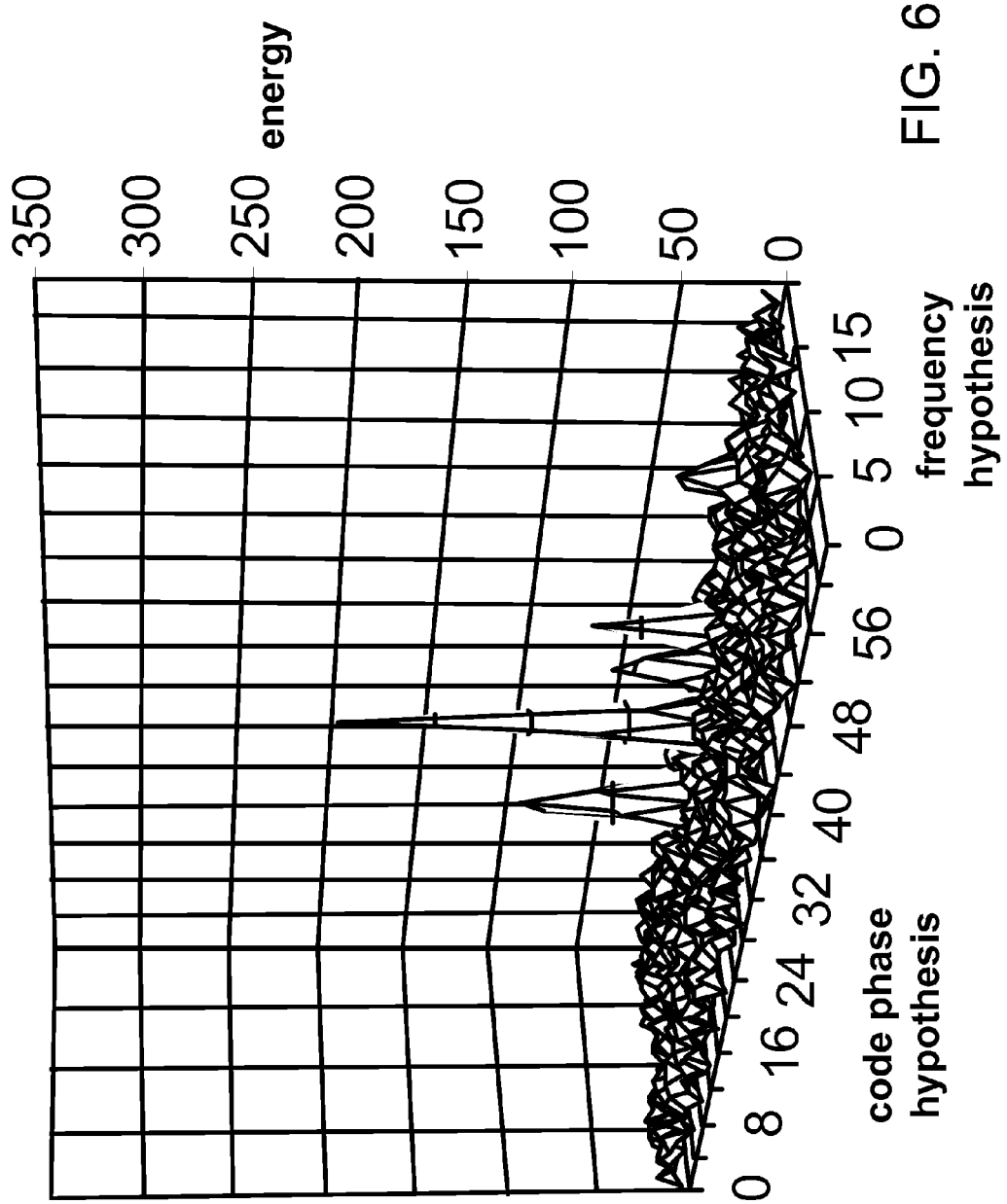
FIG. 6 is an energy plot showing several peaks due to multipath instances of the same transmitted signal.

A received signal may include versions of the same transmitted signal that propagate over different paths to arrive at the receiver at different times. Correlation of such a received signal with the corresponding reference code may result in several peaks at different grid points, each peak due to a different instance (also called a multipath) of the transmitted signal. These multipath peaks will usually fall within the same Doppler bin, unless the relative velocity between transmitter and receiver changes significantly with respect to the delays among the various multipaths. FIG. 6 shows an example in which several peaks due to multipath instances of a transmitted signal are all located in the same Doppler bin.

An energy grid may also include peaks due to effects other than valid correlations of the reference code with the signal of the particular SV being searched. For example, an in-band signal from another source may also have sufficient energy to produce one or more peaks within the grid. Such a signal may be broadly referred to as a jammer.

The receiving device may be self-jamming. That is, the jamming signal may arise from an internal source. Common internal jammers include clock spurs or leakage from an internal oscillator such as a phase-locked loop (PLL), a voltage-controlled oscillator (VCO), a local oscillator (LO) or another oscillator or clock circuit used for frequency conversion and/or for clocking of a digital logic circuit such as a processor. A jamming signal may also arise from an external source, such as a clock spur or oscillator leakage from a nearby GPS receiver.

Figure 7:
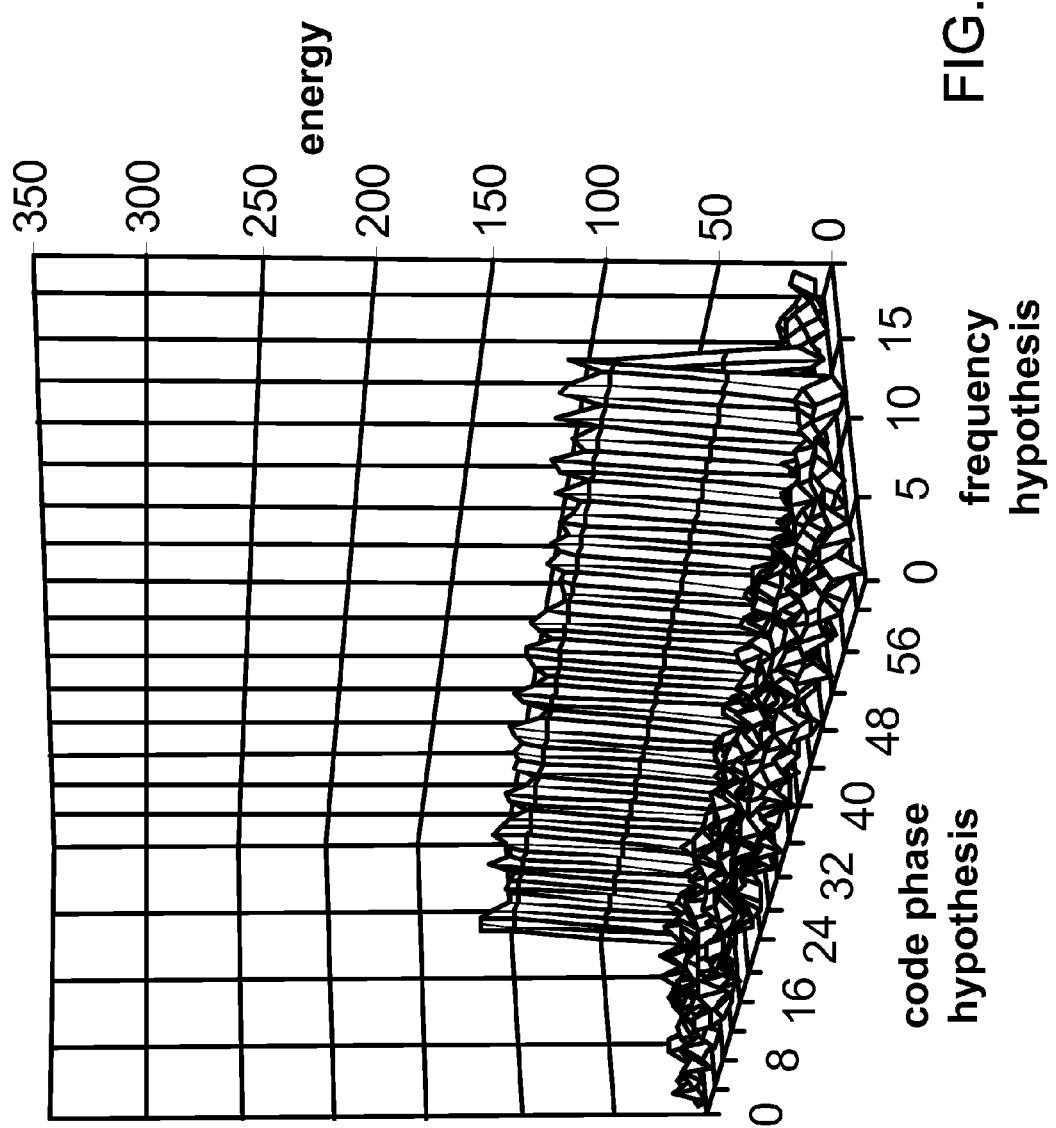
FIG. 7 is an energy plot showing an energy ridge as caused by a jammer

A continuous-wave (CW) in-band jamming signal will be spread across code space by the correlation operation, which will also attenuate the signal by about 30 dBc. As shown in the example of FIG. 7, a jammer may cause a series of peaks having similar energies at many or all of the code phase hypotheses at the corresponding frequency. Because the received GPS signal is so weak, even a jammer well below the thermal noise level may be enough to cause a large number of relatively strong peaks in the energy grid and thus prevent a GPS receiving device from finding an existing valid correlation peak.

In an ideal situation, the peak having the highest energy within the grid would correspond to the valid correlation, so that locating the code among the various hypotheses would simply be a matter of finding the peak with the highest energy. As demonstrated in the multipath example of FIG. 6, however, the highest peak within a grid may not be the most accurate. Therefore it is desirable to conduct additional processing of at least some of the grid values to locate the received code.

It is generally desirable to minimize chip area. Because arrays of data storage elements (such as memory cells) tend to occupy a lot of chip area, it is generally desirable to implement a chip design such that the number of data storage elements is reduced without unduly affecting other operating parameters. It may be desired to implement a searcher (or its processing logic) such that the array of storage elements to which the grid values are stored is reused in successive searches (e.g. searches using a different reference code, or using the same reference code on a different portion of the received code). Such a searcher may be configured to extract enough information from the grid to support a search for the best peak, and to store this information or to otherwise provide it to another unit (e.g. to be stored and processed), before allowing the grid to be overwritten. For example, the operations of directing the search and reporting the peaks may be executed by one processing unit (e.g. in firmware), while the operations of determining which is the best one may be executed by another processing unit (e.g. in software) that cannot access the full grid. Typically, the information stored includes a maximum peak list, or a list of the strongest peaks of the grid (for example, the ten peaks having the highest energies) and the code phase and frequency hypotheses to which they correspond.

A large search may be performed by segmenting the desired search space, in either or both dimensions, into several smaller windows. For example, results from search windows that are adjacent in code space may be combined to effectively create a larger search window in code space. In such manner, eight 32-chip windows (each covering e.g. 64 hypotheses) may be combined to create an effective window of about 256 chips (e.g. about 512 hypotheses). Likewise, results from search windows that are adjacent in frequency space may be combined to effectively create a larger search window in frequency space.

It may be desirable to overlap the windows that are to be combined, especially in a case where the resulting grids will be processed independently from one another. For example, an overlap of at least one hypothesis may be desired so that it may be determined whether a hypothesis at the edge of a grid is a local maximum. Moreover, it may be desired to overlap the windows in code space by several chips so that peaks due to earlier multipaths may be identified.

Figure 8:
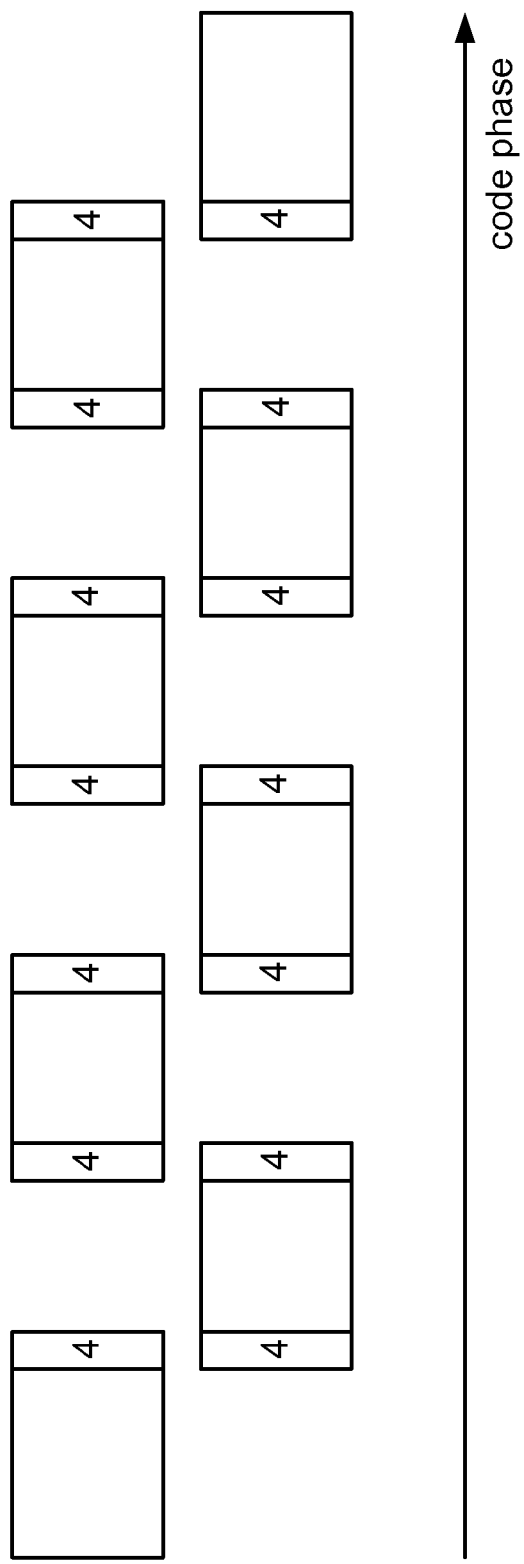
FIG. 8 is a diagram showing an overlap in code phase space between adjacent search window segments.

In one example, the largest peak in the grid is selected as the location of the valid correlation result. However, if a relatively strong peak is found in the same Doppler bin as the largest peak, and within eight chips before it, then the earlier peak is assumed to be the first (i.e. most direct) multipath of the same signal and is selected as the valid correlation result instead. If the earlier peak occurs in a different window segment than the largest peak, then the association between the two peaks may remain unknown. Therefore, it may be desirable to overlap the individual window segments (in this case, by four chips) as shown in FIG. 8.

Unfortunately, such overlapping adds overhead to the search process. If each of the eight window segments in FIG. 8 is 64 hypotheses wide, the resulting effective search window will be only 484 hypotheses wide, even though the width in total number of searches performed is 512.

To avoid the overhead associated with segmented search windows, it may be desirable to increase the size of the search window instead. For example, it may be desired to implement a search window whose dimension in code space and/or frequency space may be changed dynamically (e.g. from 64 up to 512 ½-chip hypotheses in code space).

Figure 9:
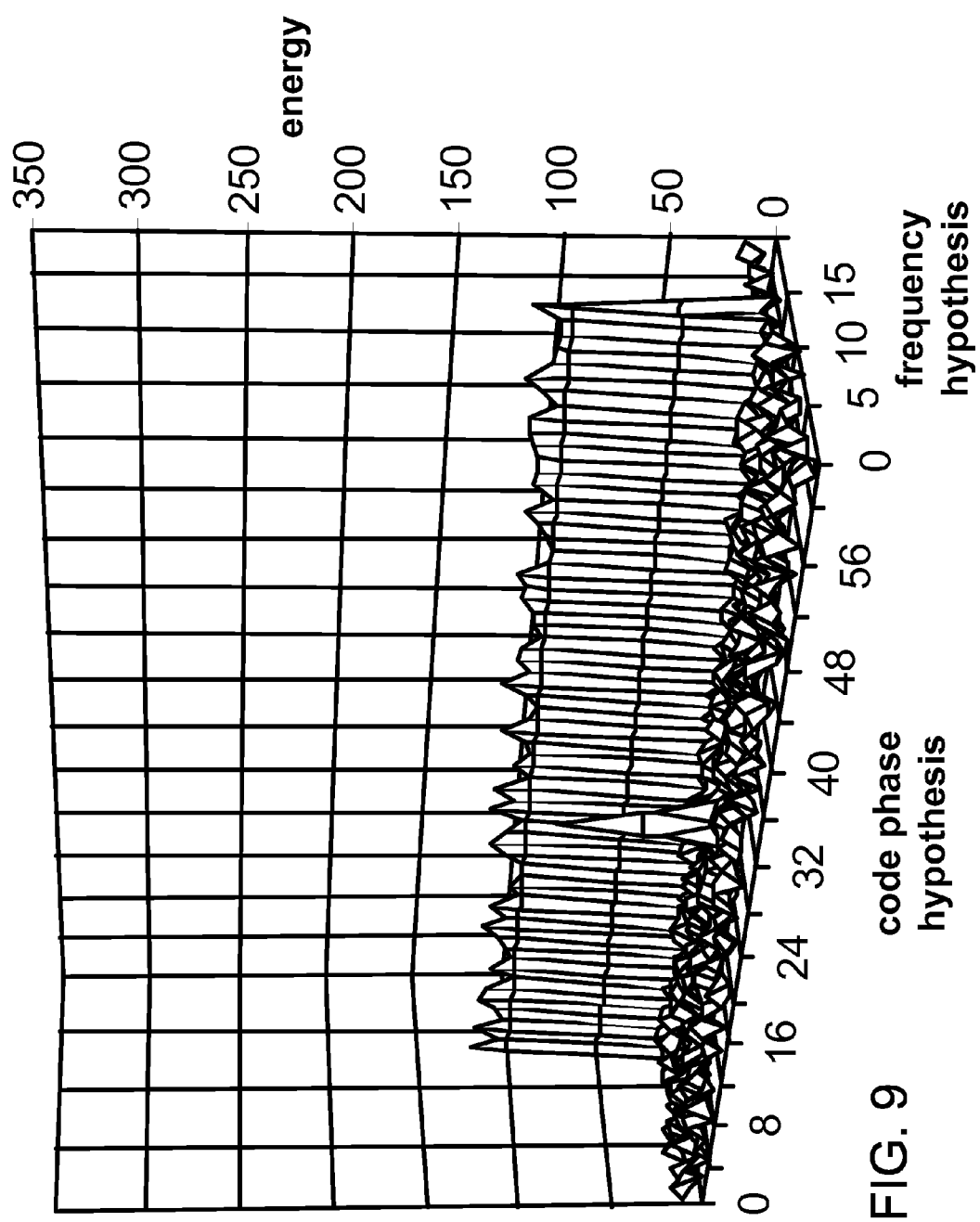
FIG. 9 is an energy plot showing an energy peak and an energy ridge.

FIG. 9 shows an energy grid in which the peaks of a jammer ridge all have higher energy values than the valid peak. In such a case, all of the entries of a maximum peak list of reasonable size may be occupied by the jammer, thus preventing location of the signal. As the number of spurious peaks caused by a jammer will be expected to increase with the size of the search grid in the code phase dimension, a jammer within a search window that is extended in code phase will be even more likely to overload a maximum peak list.

Figure 10:
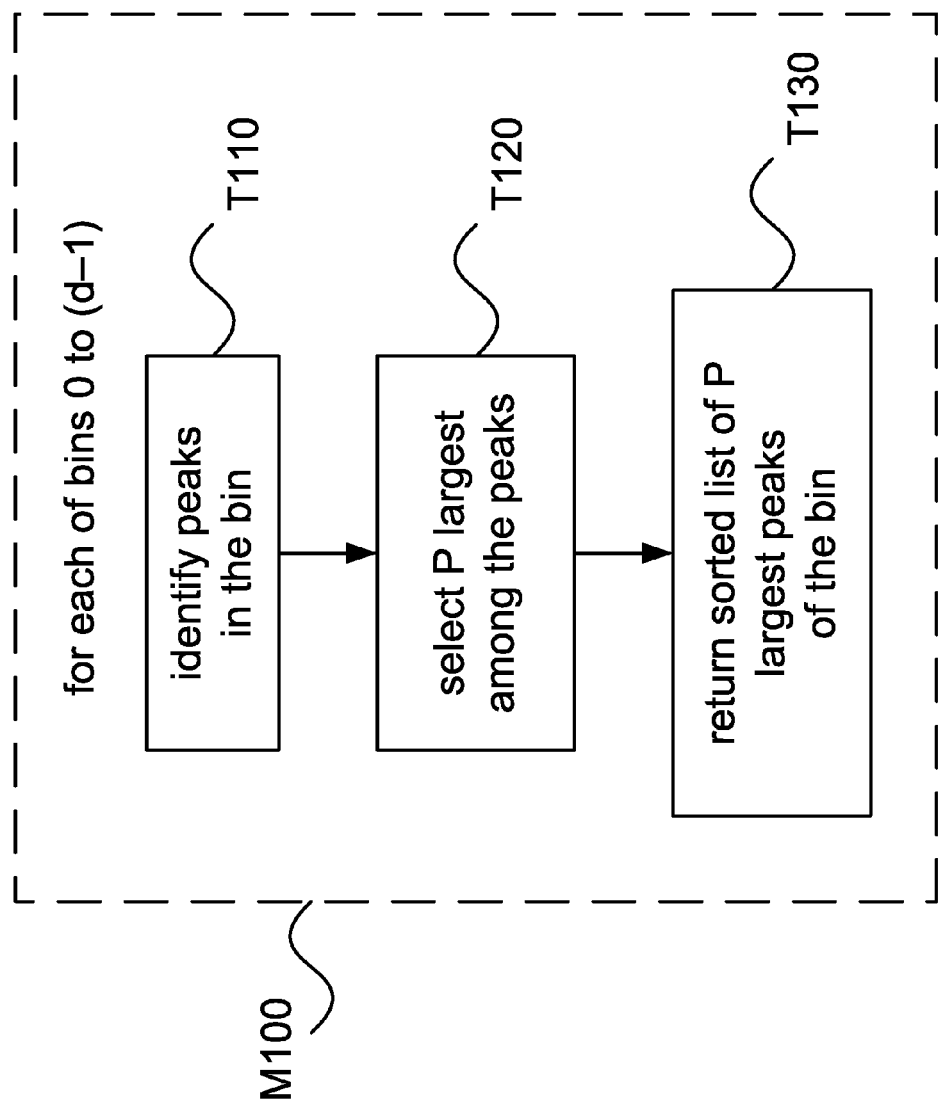
FIG. 10 is a flowchart of a method M100 according to an embodiment.

FIG. 10 shows a flowchart of a method M100 according to an embodiment. Such a method may be performed for each of the D bins in an energy grid, or it may be desired to exclude some of the bins from this processing operation. For example, sufficient information to determine whether any of the energy results in the outer Doppler bins are local maxima may not be available. Therefore, it may be decided to perform the method only on the (D−2) other bins. Reasons may exist for excluding other bins as well. For example, previous searches may indicate that one or more bins are too corrupted to yield reliable results, or it may be desired (e.g. on the basis of additional information) to reduce the search to a more narrow portion of the frequency space. Thus, method M100 may be performed for each of d bins in the energy grid, where d is greater than one and less than or equal to D.

Although as a matter of convenience this description refers to the notion of a grid of energy values, it should be understood that it may not be necessary for all of the values in such a grid to exist at any one moment. While some values are being processed (for example, according to an implementation of method M100), other values of the "grid" may not yet have been calculated, while values of the "grid" that have already been processed may have been replaced. Indeed, even within a bin it may not be necessary for all of the values to exist at any one moment, and processing of a bin according to some implementations of method M100 may begin before all bin values are available.

Task T110 identifies peaks in the bin. For example, task T110 may be implemented to classify as peaks those energy results which are local maxima in code phase space and in frequency space. Task T110 may skip the first and/or last code phase hypotheses for each bin, as sufficient information to determine whether the results at these points are local maxima may not be available. However, it may be desired to perform task T110 such that results at grid points which are excluded from method M100 are still considered in determining whether a result under test is a local maximum. In some implementations of task T110, computational complexity may be reduced by skipping (in code phase and/or in frequency) grid points that are adjacent to identified local maxima in either dimension.

Task T120 selects the P largest among the peaks in the bin. The value of P may be selected according to a desired maximum allowed number of multipaths N. The value of N, which may be selected heuristically, may be chosen from among a set of values according to a characteristic of the received signal and/or the receiving environment. The presence of separable multipaths has been found to occur mostly at very low signal-to-noise ratios, with the highest number of multipaths occurring in an urban canyon environment. In one example, the value of N is set to four. It may be desirable to set the value of P to at least (N+1).

It may be desired to select different numbers of peaks from different bins, e.g. based on past search results. In some implementations, the values of parameters P and/or N may vary from bin to bin. For example, a preferred manner of excluding one or more bins from method M100 may be to select zero peaks for such bins in task T120. Tasks T110 and T120 may be performed serially and/or in parallel.

Task T130 returns a sorted list of the P largest peaks of the bin. For example, task T130 may sort each peak list and forward the sorted peak lists to another task for further processing. In one example, method M100 is performed by a first array of logic elements (e.g. an embedded processor) according to a firmware program, and task T130 passes the sorted bin lists to a second array of logic elements (e.g. a microprocessor) for further processing according to a software program. Sorting of the bin peak lists may already be accomplished with the completion of task T120, as a peak list may be sorted as each peak is selected.

Figure 11:
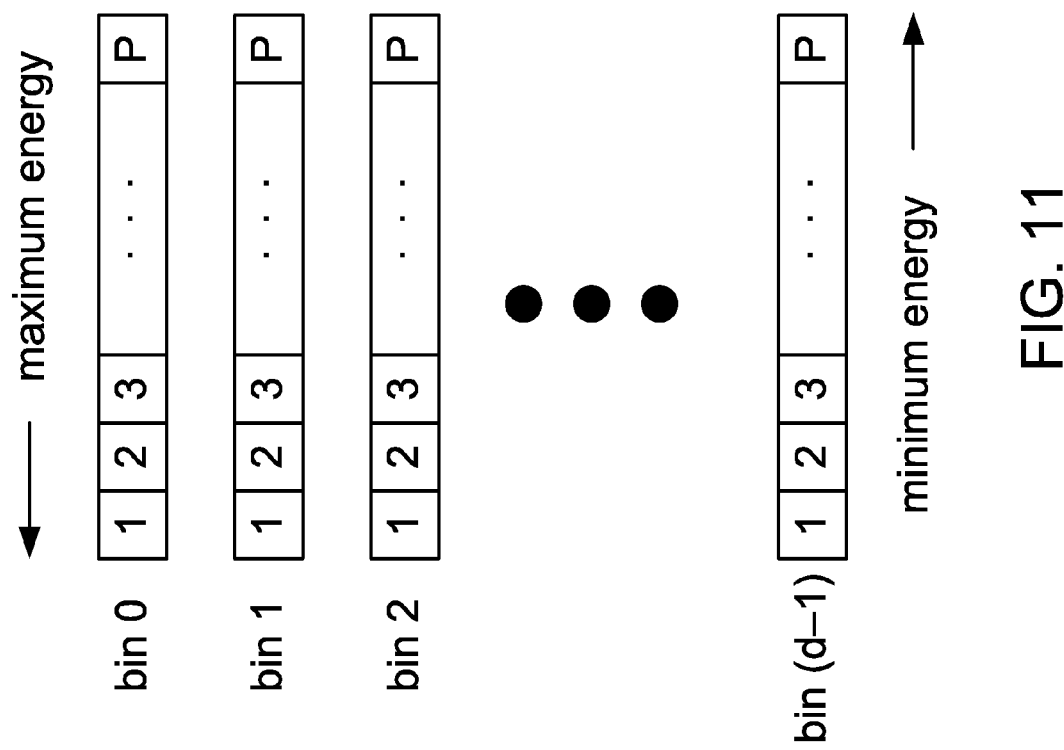
FIG. 11 is a block diagram representing a set of sorted lists of peaks.

FIG. 11 shows a set of d lists of peaks as may be created by an implementation of method M100. Each list corresponds to one of the bins 0 to (d−1), and each list entry indicates an energy result and is associated with a corresponding code phase hypothesis. Each list is sorted by energy in decreasing order of magnitude.

Figure 12:
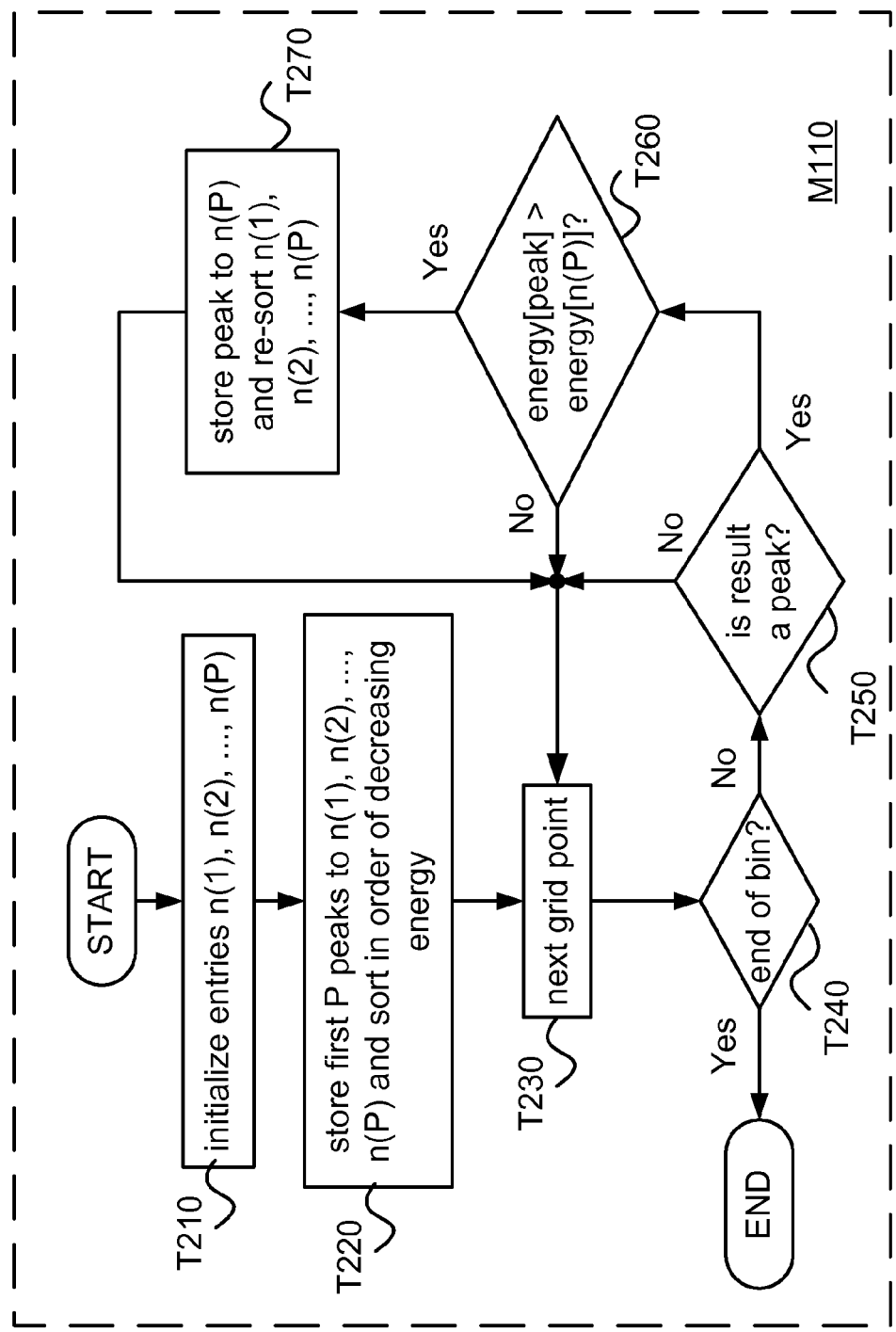
FIG. 12 is a flowchart of an implementation M110 of method M100.

FIG. 12 shows a flowchart of an implementation M110 of method M100. Task T210 initializes a set of entries n(1) to n(P), each entry being configured to indicate a code phase and a corresponding energy result. Task T220 stores the first P peaks to n(1)-n(P), and sorts the entries by energy in decreasing order of magnitude. Tasks T230 and T240 are loop maintenance tasks that cause the method to proceed through the grid points in the bin. Task T250 determines whether the energy result at the current grid point is a peak. For example, task T250 may determine whether the energy result is a local maximum in code phase and in frequency (or, alternatively, in one or the other dimension). If the result is a peak, task T260 compares the energy value of the peak to that of n(P). If the energy value of the peak is greater than n(P), task T270 replaces entry n(P) with the peak and re-sorts the entries n(1)-n(P) by energy in decreasing order of magnitude.

In one application, method M110 is performed by a module (e.g. a search processor, which may be an array of logic elements such as a dedicated or embedded processor) according to a routine in firmware, and the resulting list is stored or otherwise made available to another module (e.g. an array of logic elements such as a microprocessor) for further processing according to a routine in software.

In addition to one or more valid peaks, an energy grid may include peaks from interfering signals such as one or more jammers and/or cross-correlations. As shown in the example of FIG. 9, a jammer may cause enough peaks with higher energies than a valid peak to flood a reasonably sized list of maximum peaks, thus preventing the valid peak from being located. A set of peak bin lists as created by method M100 provides information about peaks in more than one Doppler bin. At least some implementations of method M100 may be applied to support rejection of one or more corrupted bins and successful location of the signal. At least some implementations of method M100 may be applied to advantage with search windows that are extended (possibly dynamically) in at least the code phase dimension, reducing the likelihood of losing a valid peak in one bin because of large numbers of peaks due to jammers in one or more other bins.

Figure 13A:
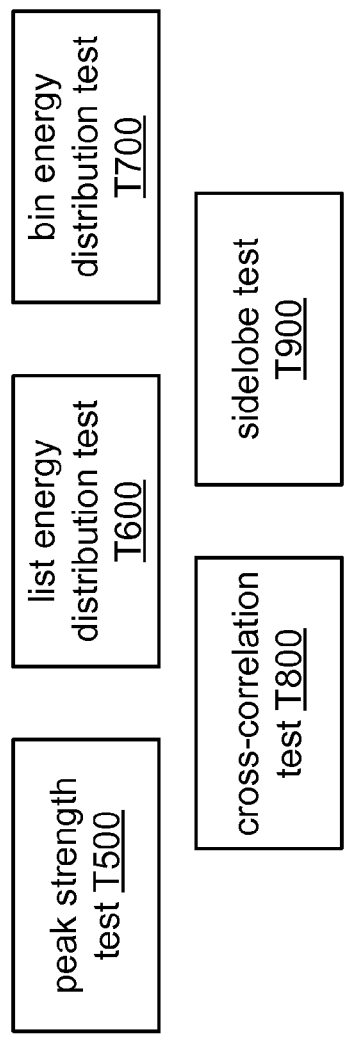
FIG. 13A is a diagram showing several tasks that may be combined with an implementation of method M100.

FIG. 13A shows examples of several other tasks that may be performed on the bin lists produced by method M100 and/or on the peaks in those lists. Peak strength test task T500 compares the energy value of at least one peak in the list to a minimum value relating to a noise level. List energy distribution test task T600 tests a distribution of energy among peaks in the list. Bin energy distribution test task T700 compares the energy value of one or more peaks to a noise measure for the bin.

Embodiments include methods in which an embodiment of method M100 is combined with a bin culling procedure, in which one or more of the frequency hypotheses may be rejected (e.g. not considered during further processing operations) based on the outcomes of one or more of tasks T500, T600, and T700. Alternatively, any of tasks T500, T600, and T700 may be applied on a peak-by-peak basis, such that rejection of a peak does not prevent another peak from the same bin from being considered. Other tests that may be conducted on the peaks in the bin lists include cross-correlation test task T800, which rejects peaks likely to be due to cross-correlations with other codes, and sidelobe test task T900, which rejects peaks that are likely to be sidelobes of another peak.

Figure 13B:
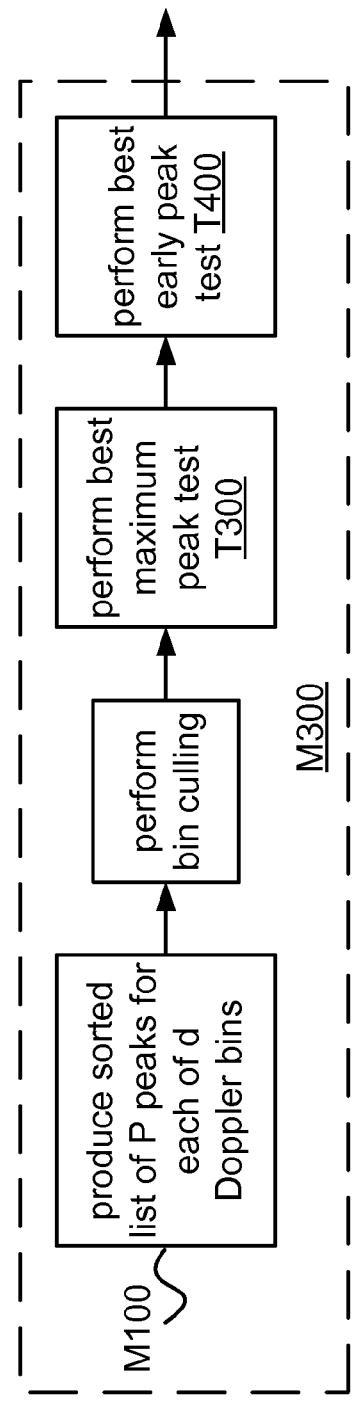
FIG. 13B is a flowchart of a method M300 according to an embodiment.

FIG. 13B shows a flowchart of a method M300 according to an embodiment. A bin culling procedure may include one or more of peak strength test task T500 and list energy distribution test task T600. Best maximum peak test T300, which selects the most likely valid maximum peak from among the surviving bins, may include tasks such as bin energy distribution test task T700, cross-correlation test task T800, and/or sidelobe test task T900. Best early peak test T400, which determines the presence of a more direct multipath related to the best maximum peak, also may include tasks such as bin energy distribution test task T700, cross-correlation test task T800, and/or sidelobe test task T900. The method returns a Doppler offset and/or a location in code phase that may be used to compute a pseudorange.

Figure 14A:
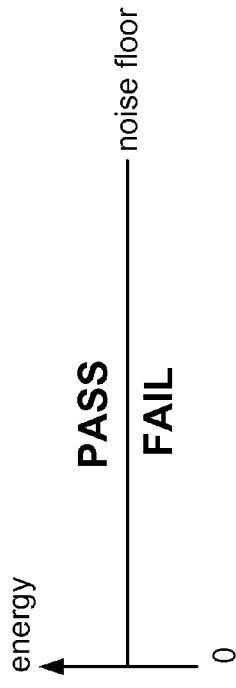
FIG. 14A is a diagram showing pass and fail regions of an implementation of peak strength test task T500.

A culling procedure may include discarding a bin if it is determined that the peaks in the corresponding bin list are not sufficiently distinct from the noise floor. An implementation T510 of peak strength test task T500 compares the energy value of the first maximum peak in the list n(1) to a minimum value L1. Value L1 may be based on the noise floor. For example, L1 may be the value of the noise floor, or L1 may be the sum of the noise floor and a threshold value T1, or L1 may be a value that is calculated as a percentage (e.g. 110%) of the noise floor. The value of the noise floor may be measured (for example, as obtained using a discrete level detector or by digital analysis of the received sample stream) or predicted (for example, based on theory assuming the absence of jammers). The noise floor value may also depend upon one or both of the coherent and non-coherent integration times. If the energy of the first peak is less than L1, then the energies of the other peaks in the sorted list will also fall below this value, and the bin can be discarded without further testing. FIG. 14A shows an example of the pass and fail regions of such a test in which the energy value of a peak is compared to the noise floor.

Figure 14B:
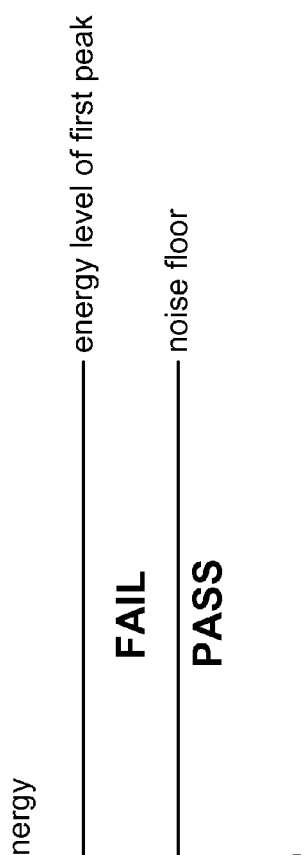
FIGS. 14B and 14C are figures showing pass and fail regions of an implementation of list energy distribution test task T600.
Figure 14C:
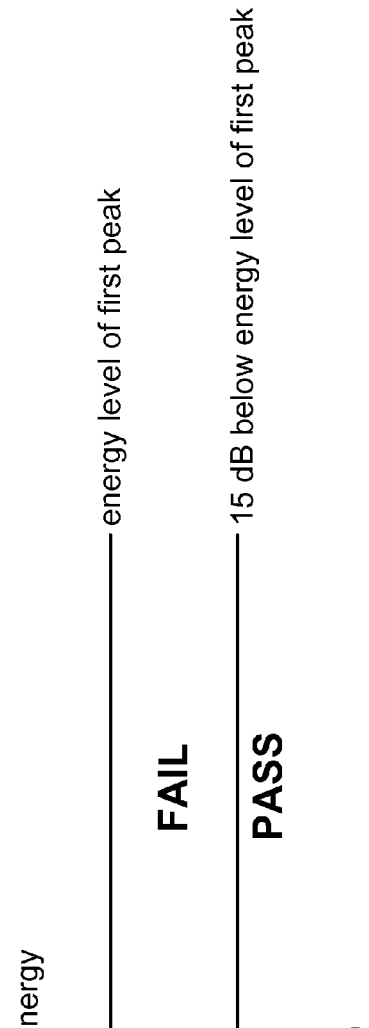
Figure 15:
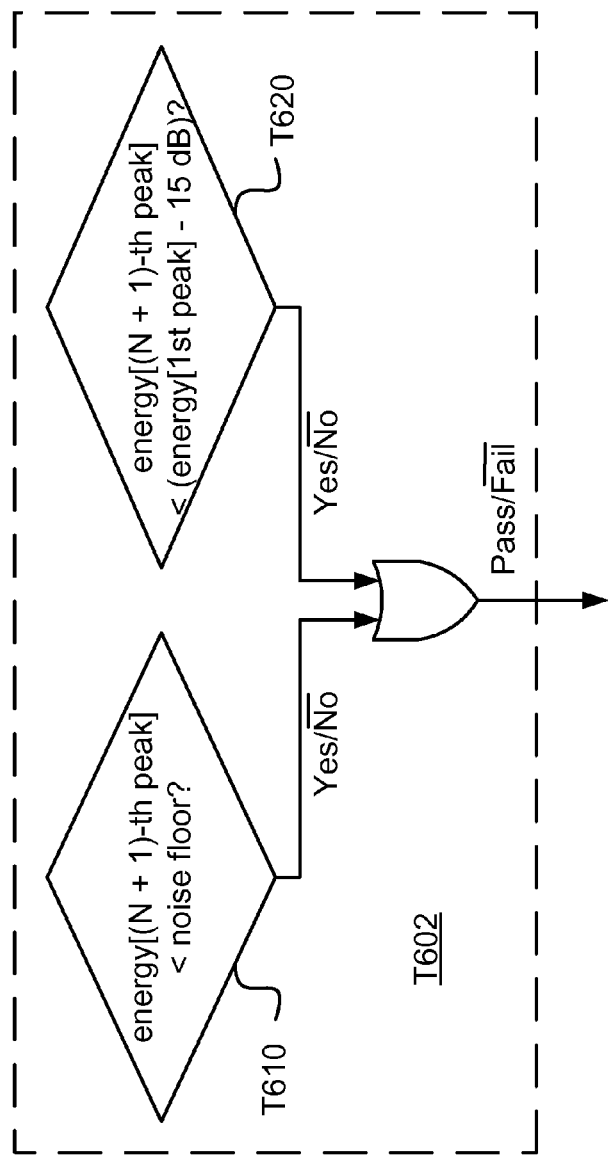
FIG. 15 is a flowchart of an implementation T602 of list energy distribution test task T600.

In a further culling procedure, the distribution of energy among the peaks in a bin list is considered. For example, such a task may reject a bin if the corresponding bin list contains too many valid peaks. Because the bin list is ordered, testing of the (N+1)-th peak is sufficient to establish whether the bin satisfies the criterion of having no more than N valid peaks. FIG. 15 shows a flowchart of an implementation T602 of list energy distribution test task T600 that includes a two-part test on the energy of the (N+1)-th peak in a bin list. In one part, task T610 compares the energy of the (N+1)-th peak to a minimum value L2 that may be based on a measured or predicted noise floor value. For example, L2 may be the value of the noise floor, or L2 may be the sum of the noise floor and a threshold T2 (where T2 may be equal to T1), or L2 may be a value that is calculated as a percentage (e.g. 110%) of the noise floor. Task T610 registers a pass if the energy of the (N+1)-th peak is below the minimum value L2. FIG. 14B shows an example of the pass and fail energy regions for an implementation of task T610.

In the other part of peak energy distribution test task T602, task T620 compares the difference between the energy values of the first and (N+1)-th peaks in the bin list to a threshold T3. It may be desirable to select a value of T3 that is low enough to avoid separating peaks of a jammer ridge from one another, but high enough to prevent peaks from unrelated phenomena (such as an auto-correlation sidelobe) from being identified as valid and thus causing the bin to be discarded. The worst-case separation between an autocorrelation mainlobe and sidelobe for a GPS C/A code is 21.6 dB, and in one example, the value of T3 is set to 15 dB to allow a margin for variation and error. If the difference between the energy values of the first and (N+1)-th peaks is less than 15 dB, then it is assumed that the (N+1)-th peak is not due to an auto-correlation sidelobe, and the bin is rejected for having too many valid peaks.

If the (N+1)-th peak is below the noise floor, then the bin has no more than N peaks above the noise level. If the (N+1)-th peak is above the noise floor but more than a threshold value below the maximum peak, then it may be due to an auto-correlation sidelobe and thus be invalid, such that the bin still has no more than N valid peaks. In either case, the number of valid peaks in the bin is sufficiently limited to support the conclusion that the bin is not corrupted by a jammer. If the peak fails both tests (i.e. it is a valid peak), however, then the bin contains too many valid peaks and it is discarded. Tasks T610 and T620 may be performed in parallel or in either order, and either test may be skipped once the other has failed. In other implementations, one or both of tasks T610 and T620 may be configured according to an alternate logic. For example, the tasks may be configured such that a peak above the noise floor passes test task T610, a peak within the threshold passes test task T620, and passing both tests indicates a valid peak.

Figure 16:
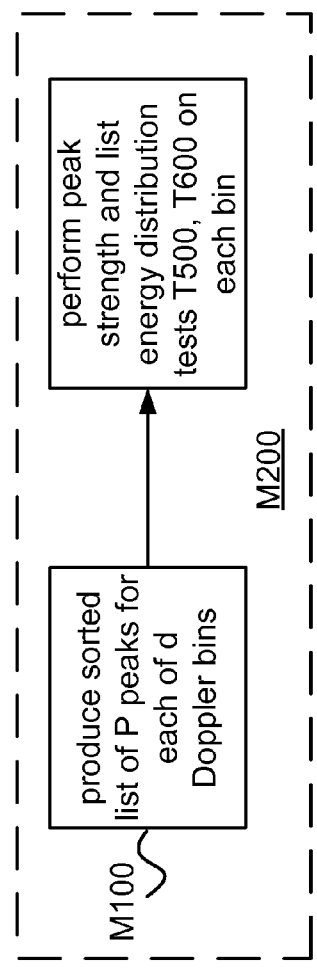
FIG. 16 is a flowchart of a method M200 according to an embodiment.

A potential advantage of performing a peak strength test according to an implementation of task T500 and a list energy distribution test according to an implementation of task T600 is that a decision on whether to keep or exclude the entire bin may be made based on examining only two of the peaks of the list created by method M100. FIG. 16 shows a flowchart of a method M200 according to an embodiment that includes implementations of method M100 and tasks T500 and T600.

Another potential advantage of a list energy distribution test according to an implementation of task T600 is that such a test may exclude bins that have strong peaks due to cross-correlations with different codes. While a cross-correlation between two different GPS C/A codes will not produce a ridge like a jammer, nevertheless peaks caused by such a cross-correlation may be distinguished from those of a valid signal due to their periodicity in code space. Because of this periodicity, strong peaks due to such a cross-correlation may cause the number of valid peaks to exceed the maximum allowable number of multipaths N. The chances of excluding a cross-correlation bin as a jammer would increase as search window size increases in code phase (i.e. to include more periods of the cross-correlation function). Further embodiments include applying knowledge of which SVs are currently visible to identify the periods and/or Doppler frequencies of likely cross-correlations, determining whether peaks matching such criteria are present in the grid, and rejecting such peaks or their bins.

Figure 17:
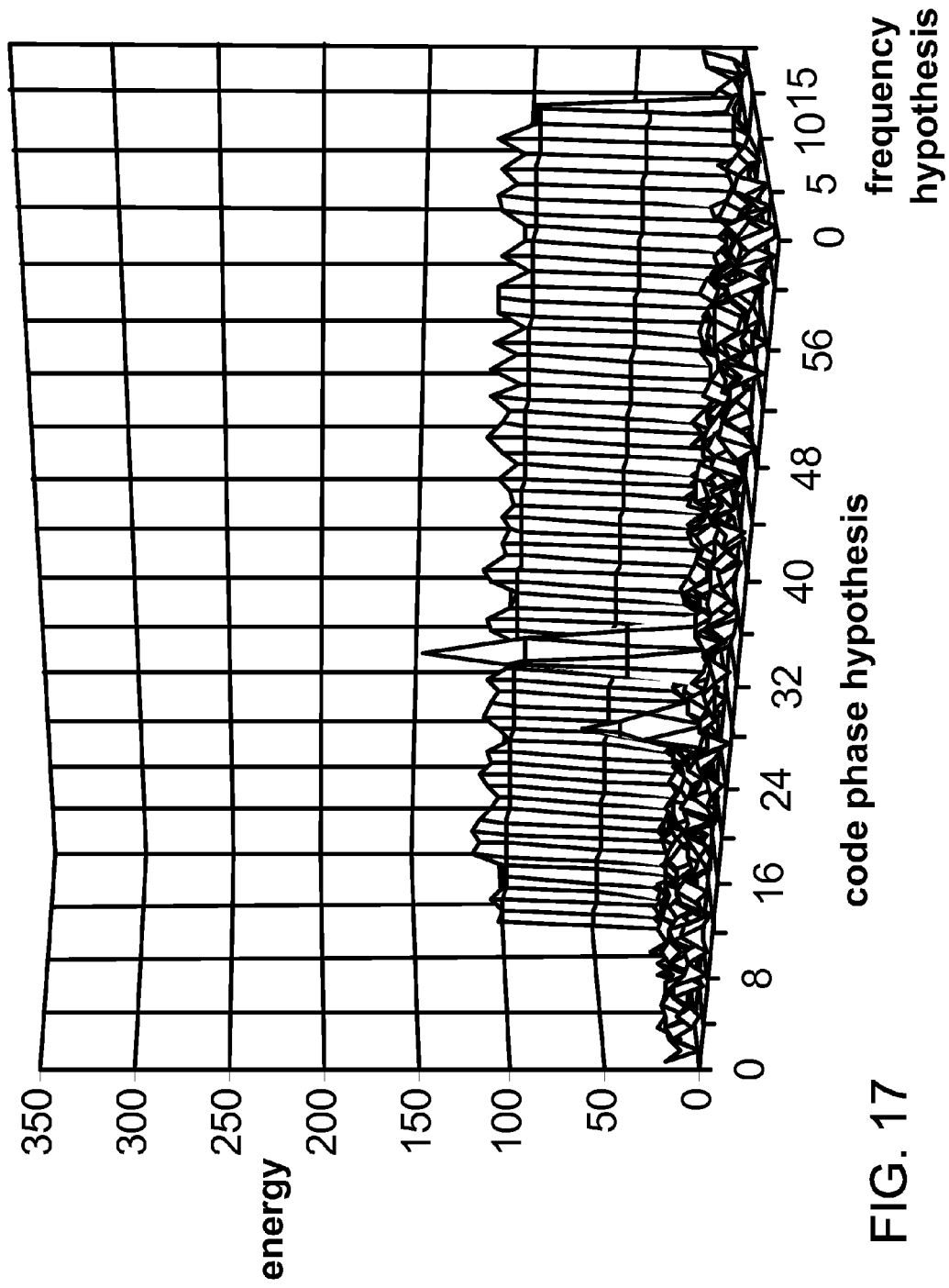
FIG. 17 is an energy plot showing energy peaks due to multipaths and an energy ridge.

A potential advantage of at least some implementations of a method as described herein is that even if several or many bins of the energy grid are corrupted by jammers, a valid peak in another bin can still be found. Even for a search window that is very large in code space, such that a jammer may cause a large number of energy peaks, a method according to an embodiment may be used to support rejecting the jammer peaks early in the processing cycle by removing the corrupted bins from consideration, while supporting subsequent identification of a valid peak by preserving a number of peaks for each of the other of d bins. FIG. 17 shows one example of an early multipath that might thus be detected even in the presence of an overwhelmingly strong jammer ridge.

A strong jamming signal may have other undesirable effects on a receiving device's operation. Receivers commonly include some form of automatic gain control (AGC) that increases amplifier gain when the received signal is weak and reduces the gain when the signal is strong (e.g. to keep the signal level within the dynamic range of the ADC(s)). A strong jamming signal may cause the AGC to reduce the gain enough to push a valid signal peak below the noise floor. In some cases, a jammer may be the dominant source of in-band energy. While the AGC could be disabled or otherwise inhibited upon detection of such a jammer (e.g. during bin culling), increasing the signal level in this manner may cause the signal to become clipped. In a further embodiment, frequency bands corrupted by jammers are removed from the incoming signal. For example, one or more bandstop filters may be selectably configured to attenuate an RF band in which a jammer has been detected. Such attenuation may be performed on the signal in the analog domain and/or digitally. In one implementation, a selectable attenuation is performed on a high-dynamic-range digital signal (e.g. 12 to 18 bits) before the signal is converted to a lower resolution (e.g. 4 bits) for further processing.

Further processing may be performed on the peak bin lists subsequent to an implementation of method M100 or M200. For example, procedures such as those described in U.S. Published Patent Application 2004/0042568 (Rowitch, published Mar. 4, 2004) may be applied to the peaks in the lists or surviving lists.

Figure 18:
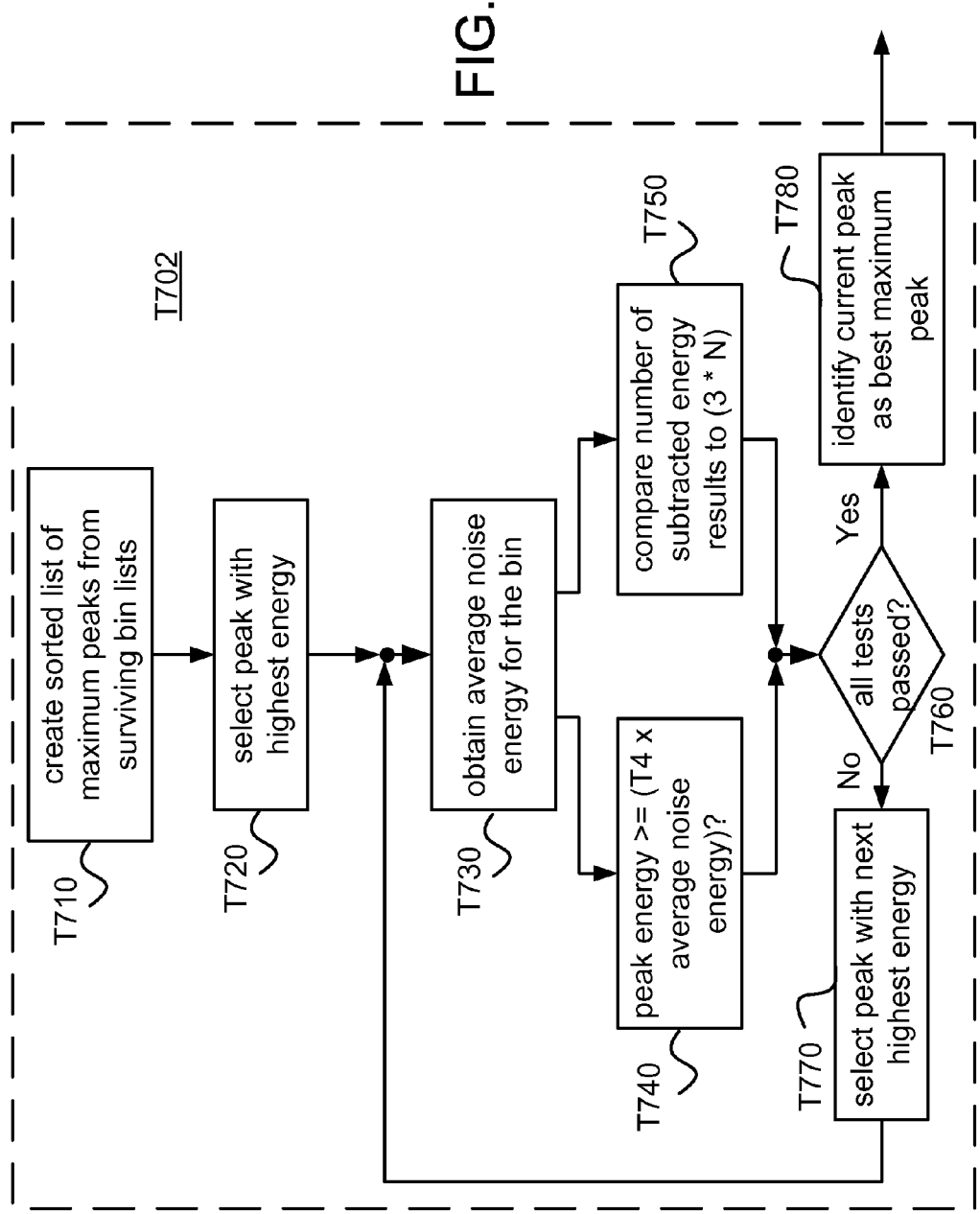
FIG. 18 is a flowchart of an implementation T702 of bin energy distribution test task T700.

Bin energy distribution test task T700 processes a set of bin lists to identify a best maximum peak. FIG. 18 shows a flowchart for an implementation T702 of task T700, which is configured to return the best maximum peak among the bin lists. This implementation, which includes one or more tests, iterates through a list of maximum peaks until a peak that passes the tests is found. Implementations of cross-correlation test task T800 and/or sidelobe test task T900 as described herein may be integrated into other implementations of task T700.

Peak selection task T710 creates a list of maximum peaks from the bin lists by selecting the peak having the highest energy from each bin list (or from each surviving bin list, if bin culling has been performed). Task T710 may also sort the peaks in this list by their energy values (e.g. in decreasing order). In some applications, task T710 may be implemented to select and list more than one peak from one or more of the bins. Loop initialization task T720 selects the peak having the highest energy in the list as the current peak for testing.

Even if the current peak is above a noise floor value, the corresponding bin may be corrupted by noise such that the peak is unreliable. For the current peak, noise estimation task T730 obtains a measure of the average noise energy for the corresponding bin. This noise energy measure, which may be referred to as a mean measured noise estimate, may be calculated as the average energy of the non-peak samples of the bin.

In one implementation, task T730 includes calculating the energy sum for the bin, subtracting the energy due to peaks, and dividing the resulting sum by the number of values in the bin less the number of subtracted values. The peaks to be subtracted may include only those peaks that appear in the bin list or may also include other local maxima that have an energy value above some threshold. In one example, the peaks to be subtracted include local maxima that are above the noise floor and within 15 dB of the maximum peak in the bin. Subtracting the energy due to peaks may also include subtracting the energy values of grid points in the bin that are adjacent to peaks, such that three values are subtracted from the bin for each peak. In some implementations, the average noise energy measure is calculated and provided by a searcher with the corresponding bin list.

The ratio between the energy value for a peak due to a jammer and a noise estimate for the corresponding Doppler bin is typically much smaller than the ratio between the energy value for a valid peak and a noise estimate for the corresponding Doppler bin. Ratio test task T740 compares the energy value for the current peak to the average noise energy for the bin. If the ratio between these values is less than (or equal to) a threshold T4, the peak is rejected. If the maximum peak in a bin fails this test, then all other peaks in the bin will fail as well and may be ignored.

Threshold T4 may be fixed or variable. For example, the value of T4 may be selected according to the period of coherent integration and/or the number of non-coherent integrations. The following table shows one example of a set of different values of T4:

| Coherent integration (milliseconds) | Non-coherent integrations | Total integration time (milliseconds) | T4 (in dB) |
| --- | --- | --- | --- |
| 20 | 4 | 80 | 16.832 |
| 20 | 44 | 880 | 13.718 |
| 80 | 22 | 1760 | 15.494 |

Task T700 may also include a coarse jammer detection task T750, which rejects the bin if the total number of energy values that were subtracted from the bin to obtain the average noise energy measure exceeds a threshold T5. In one example, the value of T5 is set to the product of the number of energy values subtracted from the bin for each peak (three, in the example above) and the maximum allowed number of multipaths N.

In addition to peaks caused by cross-correlations between the reference code and the code being searched, the energy grid may also include peaks caused by cross-correlations between the reference code and other codes. In a GPS reception scenario, for example, the received signal may include codes transmitted by as many as twelve different SVs, and the energy grid may be expected to include peaks due to cross-correlations between the reference code and the codes of several of these SVs.

The worst-case code separation between C/A codes is only 21.6 dB. Cross-correlation of the reference code with a code from another SV is most likely to present a problem when the signal from the SV being searched is highly attenuated relative to that of the other SV. Such a scenario may occur, for example, when the SV being searched is near the horizon, or blocked by an obstacle, while the other SV is within a lineof-sight. Signals from one or more pseudolites, synchrolites, or GPS repeaters may also cause a strong cross-correlation.

Because the C/A codes have a period of one millisecond, the most significant cross-correlations occur when the difference between the interfering SV signal and the target SV signal is a multiple of 1 kHz. Information about the Doppler frequency offset of a potentially interfering SV signal may thus be used to determine the most likely location(s) of a cross-correlation with that signal in frequency space.

Figure 19:
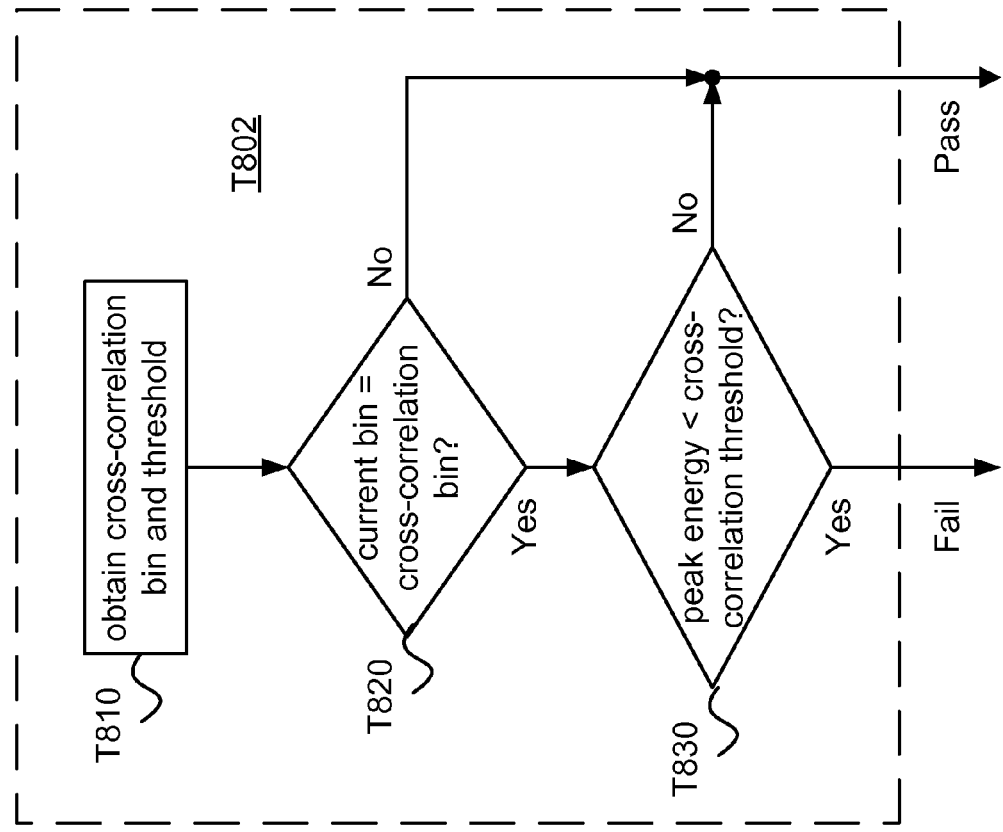
FIG. 19 is a flowchart of an implementation T802 of cross-correlation test task T800.

Cross-correlation test task T800 compares the energy value and frequency hypothesis of a peak to parameters of a cross-correlation mask. FIG. 19 shows a flowchart of an implementation T802 of cross-correlation task T800. Task T810 obtains a cross-correlation bin and threshold. Task T820 compares the bin of the current peak to the cross-correlation bin. Task T830 compares the energy value of the current peak to the cross-correlation threshold. If the peak falls within the mask, it is rejected as probably due to a cross-correlation with the signal of another visible SV. Task T802 may be iterated to test the peak against masks for one or more other SVs.

In obtaining the mask parameters, task T810 may reference a lookup table that contains the identities and current Doppler locations of other visible SVs. This table may be based on information gained from past searches and/or obtained from another device such as a PDE. The Doppler difference between the location of the current peak and the location of the other SV is determined, and the modulo 1 kHz remainder of this value is calculated to indicate the cross-correlation bin. Other mask parameters such as energy value threshold, mask width in Hertz or bins, and/or the modulo divider may be based on the energy value of the signal of the other SV and/or aspects of the current search such as bin spacing and coherent and/or noncoherent integration length. For a large Doppler difference between the peak and the other SV signal, a lower energy threshold may be used (e.g. due to code smearing at large Doppler offsets).

Further implementations of task T800 may also be configured to test for compound cross-correlations arising from multiple sources (e.g. more than one other SV) with additive effect. A discussion of other aspects that may be included in an implementation of cross-correlation task T800 is set forth in U.S. Patent Application Publication No. 2004/0196183 (Roh, published Oct. 7, 2004), which discloses details such as masks for mainlobes, frequency sidelobes, and sample-and-hold cross-correlations (e.g. at paragraphs [0111]-[0161]).

A best maximum peak selection process may be implemented such that when a cross-correlation test is performed, the selection process has already committed to that peak. In a further implementation of task T702, for example, cross-correlation test task T800 may be performed after task T760 or T780. If task T800 discards the peak as a cross-correlation, it may be too late to select another peak from the grid.

A further implementation of a best maximum peak test task such as T702 includes a pre-emptive cross-correlation test task, which allows for an alternative candidate. The pre-emptive test task determines whether the current candidate for best maximum peak is from a suspect bin. For example, the pre-emptive test task may reference a lookup table containing the Doppler offsets of other visible SVs as described above to calculate the locations of suspect bins. If the current candidate is from a suspect bin, then the pre-emptive test task tags the peak as a possible cross-correlation and the search for the best maximum peak continues. In another implementation, the pre-emptive test task may first determine whether the suspect bin contains more than a threshold number (e.g. 2 or 3) of other peaks, which may reinforce the determination that the bin contains peaks due to a cross-correlation. If no other acceptable candidate is found, then the tagged peak is used. In another implementation, the pre-emptive test task causes more than one candidate peak to be sent to cross-correlation test task T800, such that another candidate will be available if the first one is rejected.

Figure 20:
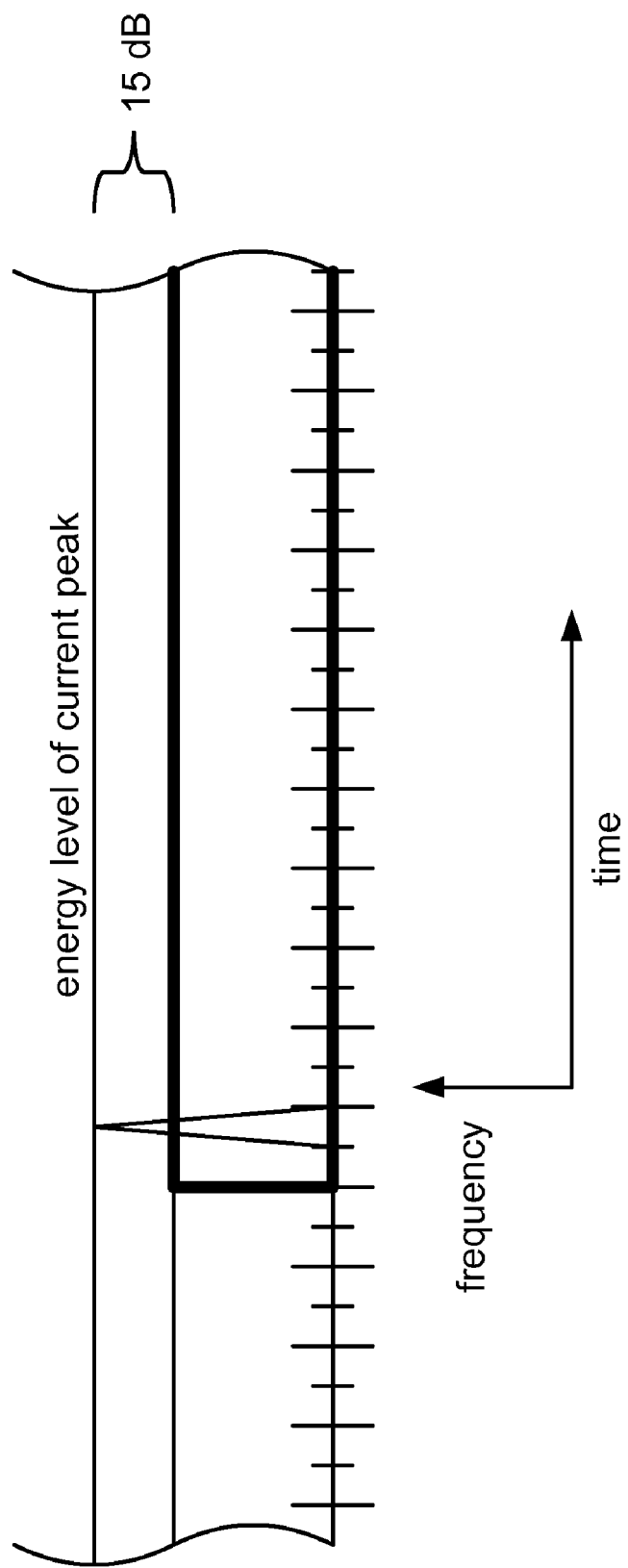
FIG. 20 is a diagram showing an example of a mask as used in an implementation of sidelobe test task T900.

A method according to an embodiment may also include a sidelobe test task T900 (for example, within an implementation of best maximum peak test T300). Sidelobe test task T900 rejects candidate peaks that may be due to sidelobes of the current peak. One implementation of task T900 applies a mask which rejects peaks corresponding to code phases that are later than or equal to ½ chip before that of the current peak (the time axis in the figure is marked in intervals of ½ chip), for rejection of frequency sidelobes (usually within one code hypothesis from the mainlobe) and all later peaks. Task T900 may apply such a mask to the same bin as the current peak, to a range including a few surrounding bins, or to all bins in the grid. The mask may also be configured to reject other unwanted peaks, such as peaks due to autocorrelation sidelobes. Sidelobes of a GPS C/A code autocorrelation function are 21.6 dB down from the mainlobe, and task T900 may apply a mask that is configured according to a threshold including a margin for variation and error. FIG. 20 shows an example of such a mask which rejects peaks having energy values more than 15 dB below the current peak. Sidelobe test task T900 may also be implemented as a separate routine to cull peaks from a best maximum peak candidate list.

The strongest peak in a bin is not necessarily the best choice for the grid. As shown in FIGS. 6 and 17, for example, an earlier but weaker multipath may be the more accurate peak. A method according to a further embodiment includes a test for a peak due to an earlier multipath.

Best early peak test task T400 searches one or more bin lists to identify peaks that are earlier than the best maximum peak. Task T400 may limit its search to peaks that correspond to code phase hypotheses up to a threshold of T6 chips earlier than that of the best maximum peak. In one example, the value of T6 is eight chips. As an error of one GPS chip corresponds to a distance of about 300 m, locating an earlier peak of a multipath signal may provide a significant increase in position location accuracy.

It may also be desirable to limit the range of the early peak search to the frequency bin that includes the best maximum peak or, possibly, a few neighboring bins as well. Otherwise, the selected peak may be due to a cross-correlation with another code. Multipaths are most likely to occur indoors, where refraction and scattering are common. Thus, any change in Doppler due to relative movement between transmitter and receiver over the time span of the early peak search window is likely to be low anyway. Moreover, signals received indoors are also likely to be weak, and weak signal scenarios are susceptible to cross-correlations.

Figure 21:
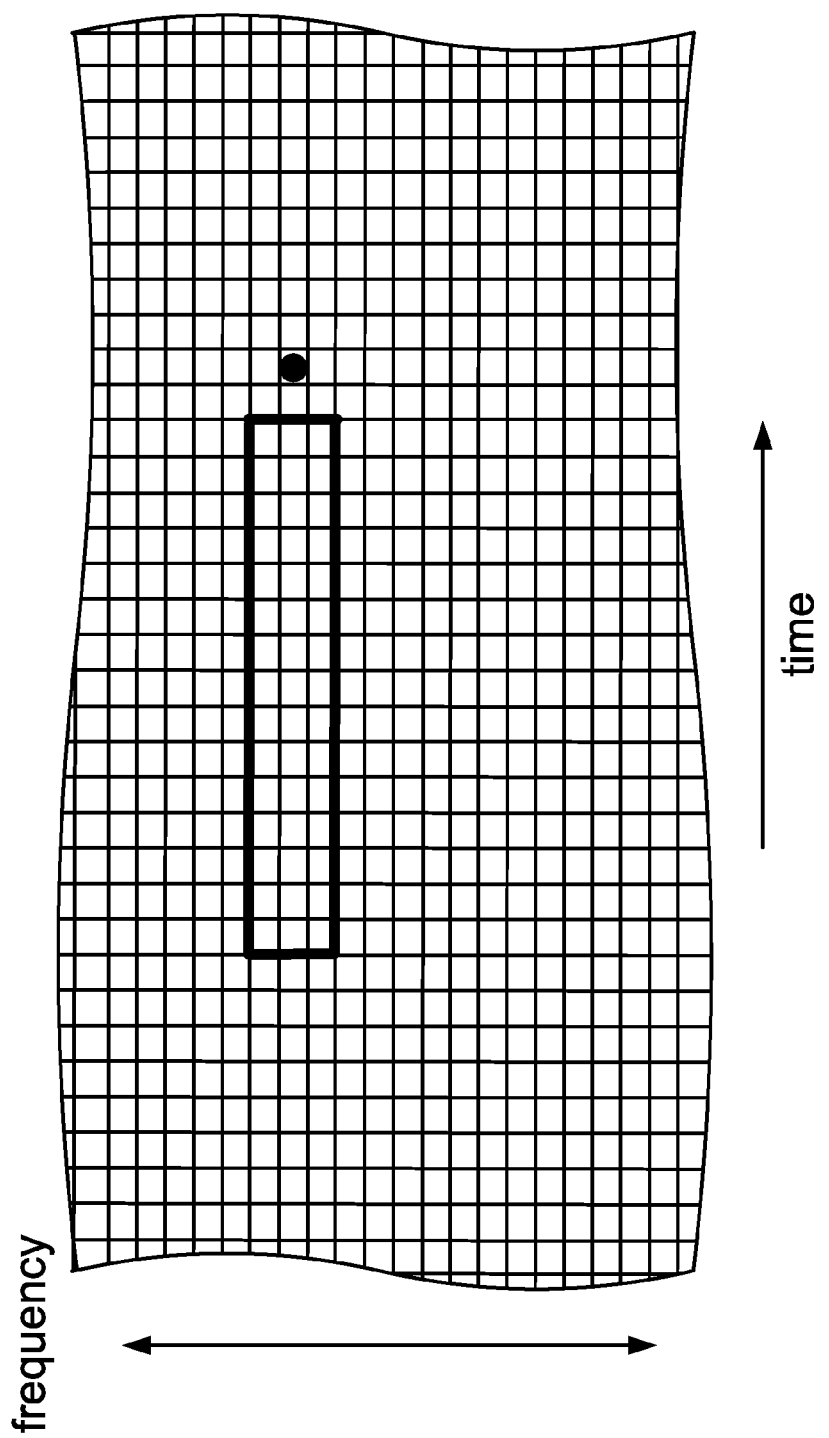
FIG. 21 is a diagram showing an example of a mask as used in an implementation of best early peak detection task T400.

In one example, peaks up to eight chips before the peak currently selected are considered as early peak candidates. It may also be desirable to exclude peaks within one-half chip from the peak currently selected (e.g. to avoid selecting a sidelobe). FIG. 21 shows one example of a mask that may be used in an early peak search, where the circle represents the peak currently selected (e.g. the best maximum peak) and the rectangle represents the mask measuring three frequency bins by eight chips (in this example, the resolution in code phase is one-half chip). The width of the mask in frequency space may depend on an expected range of Doppler change and/or refraction effects, and in other examples the mask extends two, three, four or more frequency bins on either side of the peak currently selected. It may be desirable to accept only early peak candidates having an energy value within some value (e.g. 15 dB, 9 dB, or 6 dB) of the related maximum peak. Before a candidate best early peak is accepted as indicating the signal's location, it may be desirable to test the peak according to a cross-correlation test (e.g. T800), a sidelobe test (e.g. T900), and/or any of tasks T500, T600, and T700 that have not yet been performed on the peak or its bin.

In some implementations of a system, method, or apparatus as disclosed herein, one or more of the various levels L1, L2, L3 and thresholds T1, T2, T3, T4, T5, T6 may be dynamically changed, based on one or more such factors as search window size, signal strength, total received power, and previous results. Different search modes may be used, with each mode applying a different combination of window size, bin spacing, and/or integration length. Tests may be configured according to a desired false alarm rate, and the design of a particular implementation may include tradeoffs between factors such as missed detections and false alarm rate, or accuracy and time-to-fix. An iteration of searches may be performed, with each search having, for example, a more narrow search window.

Figure 22:
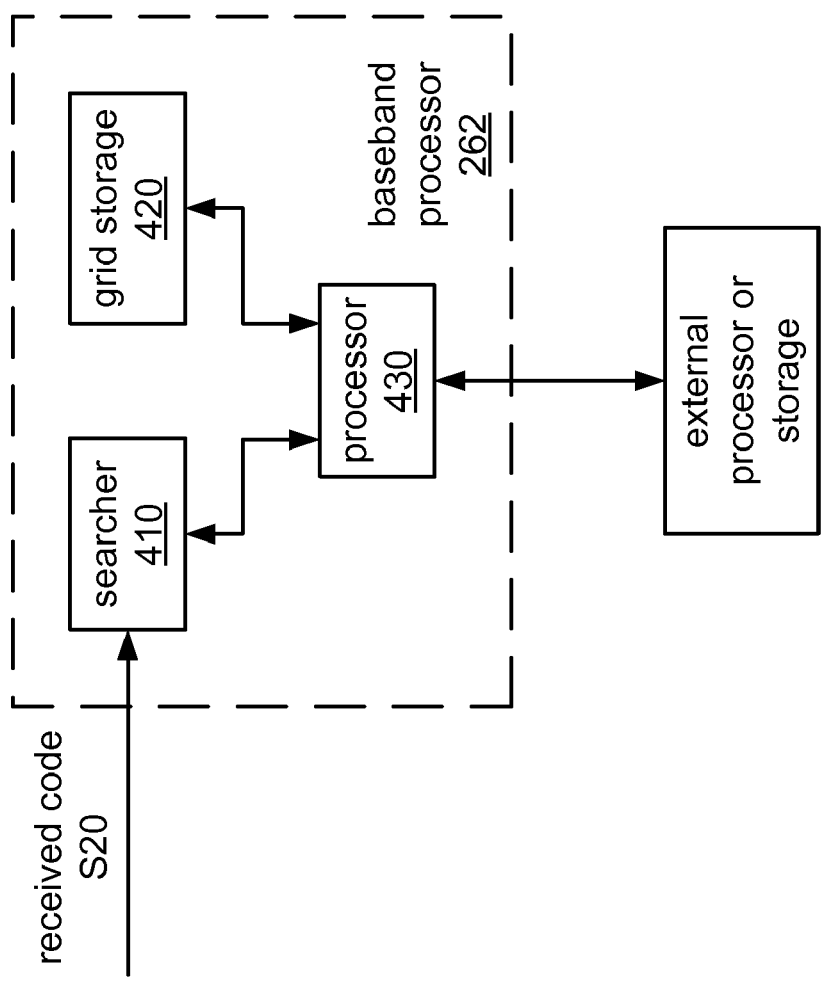
FIG. 22 is a block diagram of an implementation 262 of a baseband processor 260 in one context.

FIG. 22 shows a block diagram of an implementation 262 of a baseband processor 260 that may be configured to perform an implementation of method M100 as described herein. Processor 430 controls searcher 410 to obtain correlation results for a search window of C code phase and D frequency hypotheses and obtains sorted lists of peaks for each of d bins. Grid storage 420 may be used to store some or all of the correlation results (or energy results based on the correlation results). Grid storage 420 may also store instructions executed by processor 430 in performing the method. In this example, the sorted lists are provided to another processor for further processing (e.g. according to a best maximum peak test task and/or other tasks as described herein), although in another example, at least some further processing of the lists may be performed by processor 430. The various elements of baseband processor 262 may be implemented on the same chip (possibly with other elements, such as portions of a device for communication with a network for cellular telephony) or may be distributed across different chips or even different devices.

In a handheld or otherwise portable device, or in a device that is intended to operate on its own power source in a remote location, it may be desirable to design the device to minimize its power consumption. As RF hardware is typically relatively power-hungry, it may be desirable to activate the RF circuitry to receive and sample the signal, possibly storing the sampled signal to intermediate storage, and then to power the RF circuitry down. Searcher 410 may be activated to process the received code as it is received, or may be activated to access the code from storage possibly at a later time, to obtain correlation and/or energy results. The results from searcher 410 may also be stored in an intermediate storage. Processor 430 may then be activated or interrupted from another task to process the results from searcher 410 to provide the sorted lists or further results, possibly storing this information in an intermediate storage to be accessed when another processor is activated or interrupted.

Figure 23:
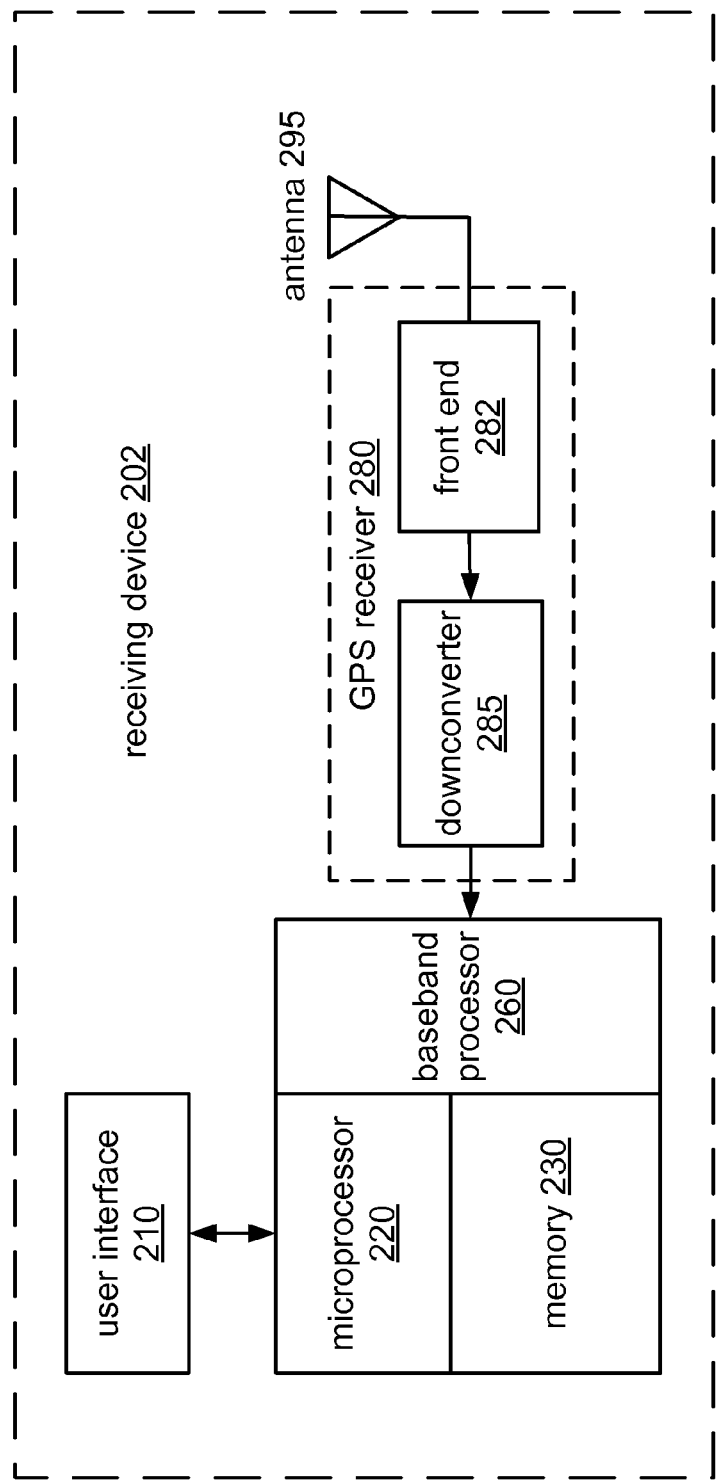
FIG. 23 is a block diagram of an implementation of a receiving device 202.

FIG. 23 shows a block diagram of an implementation of a receiving device 202 according to an embodiment. Such a device may be configured, for example, to be handheld, worn on the body (e.g. on a wristband), or vehicle-mounted. Such a device may also be configured to provide positional information, possibly in combination with Geographic Information Systems (GIS) information such as an enhanced map display. Alternatively, such a device may be configured for remote operation.

GPS receiver 280 is configured to receive and demodulate GPS satellite transmissions and provide the demodulated signal to a baseband processor 260. Baseband processor 260 is configured to derive correlation information from the demodulated signal. For a given reference code, baseband processor 260 produces a correlation function which is defined over a range of code phase hypotheses which define a search window W, and over a range of Doppler frequency hypotheses. Each individual correlation is performed in accordance with defined coherent and non-coherent integration parameters.

Figure 24A:
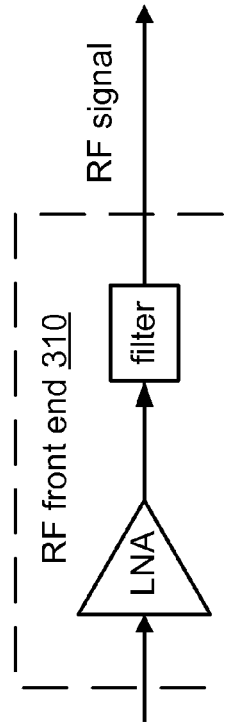
FIG. 24A is a block diagram of an example 310 of an RF front end.

An RF front end, which typically serves to amplify and/or condition a signal received via an antenna (e.g. antenna 295), may include one or more amplifiers (such as a low-noise amplifier or LNA) and/or filters (for example, to attenuate particular frequencies or bands). The RF path may also include such elements as a diplexer (or multiplexer) to separate different frequency bands within an antenna feed. FIG. 24A shows an implementation 310 of GPS front end 282 that includes an LNA and a filter (such as an LC, ceramic, or surface acoustic wave (SAW) filter).

Figure 24B:
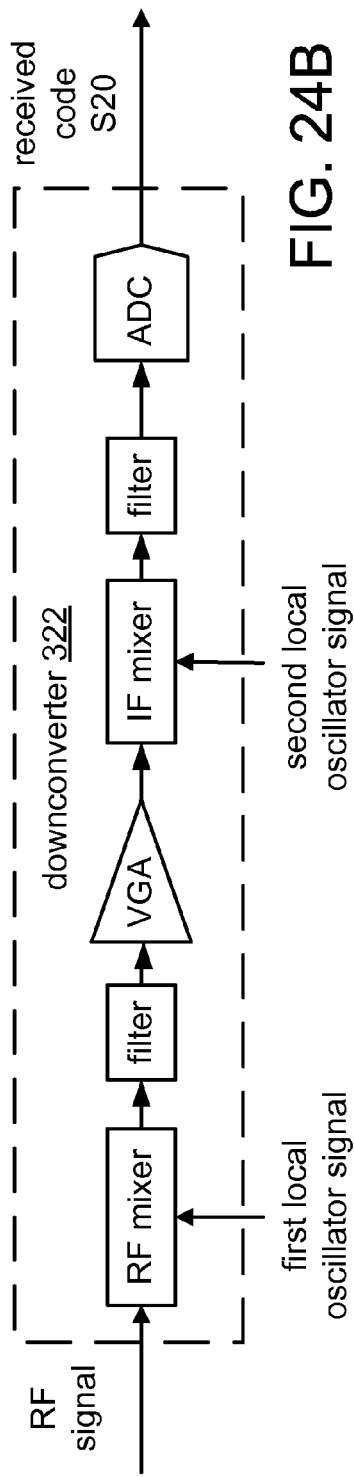
FIGS. 24B and 24C are block diagrams of examples 322 and 324 of a downconverter.

A downconverter receives an RF signal and outputs a complex signal at or near baseband. FIG. 24B shows a block diagram of one example 322 of a heterodyne implementation of GPS downconverter 285. An RF mixer applies a first local oscillator signal to convert the RF signal to an intermediate frequency (IF), e.g. on the order of 10 MHz. The IF signal is processed in an IF stage, which in this example includes a filter (e.g. to attenuate one or more images) and a variable-gain amplifier (VGA). An IF mixer applies a second local oscillator signal to convert the IF signal to baseband. The baseband signal may be filtered (e.g. to attenuate one or more images).

An analog-to-digital converter (ADC) converts the baseband signal from analog to a digital stream of samples. In cases where the received signal is modulated by digital information (via, e.g., PSK, QAM, MSK, and/or OOK modulation) at a particular rate (e.g. a chip rate), the ADC may oversample the baseband signal (at a rate of e.g. chip×2, chip×4, chip×8, chip×12, or chip×16 or within some range around such a rate). The ADC may also be configured to include two ADCs executing in parallel (e.g. each one receiving and digitizing a different respective component of a complex signal path of the downconverter). The ADC sampling clock may be derived from a local oscillator source such as a frequency reference signal. The sampling rate may be chosen depending on the desired search resolution in the code phase dimension and/or the desired bandwidth of the despread signal. Each component of the digital output may have a width of, for example, one, two, four, eight, or more bits. For a one-bit-wide signal, the ADC may be implemented as a comparator. The downconverter may also include an AGC stage upstream of one or more of the ADCs.

Figure 24C:
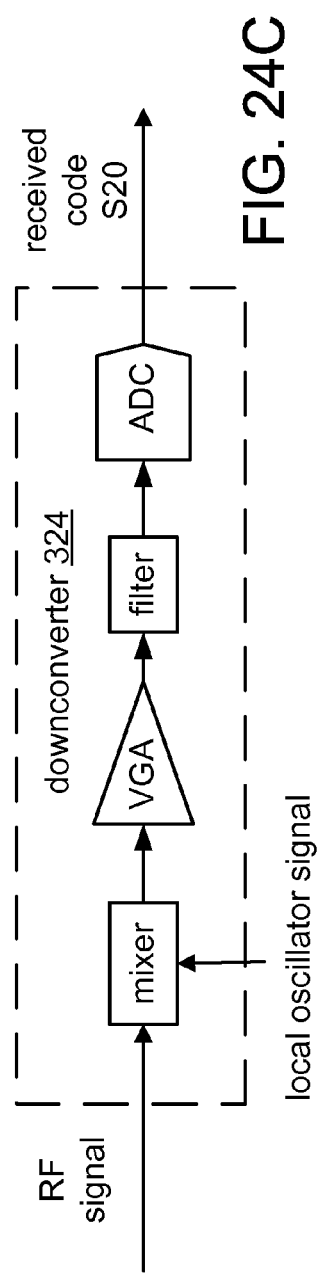

FIG. 24C shows a block diagram of an example 324 of a homodyne (or zero-IF) implementation of downconverter 285. In zero-IF conversion (also called direct downconversion), the RF signal is converted directly to baseband. Such a downconverter typically also includes circuitry for the removal or compensation of a DC offset in the baseband signal. Such a downconverter may also include amplitude control of the local oscillator signal (e.g. to reduce leakage). In a related technique called near-zero IF (or very low IF or VLIF) conversion, the RF signal is converted directly to a near-baseband frequency that may be hundreds of kHz or lower. A VLIF downconverter may be implemented with an IF stage or without one (e.g. with the conversion from IF to baseband being performed by a phase rotation of the converted signal).

A local oscillator signal is a periodic signal having a fundamental frequency that may be implemented to have any waveform suitable for the particular application (e.g. sinusoidal, square, triangular, sawtooth, etc.). One or more of the local oscillator signals may be obtained from a variable-frequency oscillator (VFO), which may be implemented as a crystal oscillator (or XO), a temperature-compensated oscillator (TCO), a temperature-compensated XO (TCXO), a voltage-controlled oscillator (VCO), a voltage-controlled TCO (VCTCO), or a voltage-controlled TCXO (VCTCXO). A typical inexpensive TCXO has stability of about 1 ppm (part per million). One particular application includes a VCTCXO having a nominal output frequency of 19.68 MHz rated at +/−5 ppm. A tolerance of +/−5 ppm corresponds to a range of +/−4 kHz out of 800 MHz, or +/−9.5 kHz out of 1.9 GHz.

One or more of the local oscillator signals applied in downconverter may be based on a frequency reference signal (for example, obtained from a VFO). For example, downconverter 285 and/or device 202 may include one or more frequency synthesizers that use the frequency reference signal as a timing reference from which a signal of another frequency (e.g. a local oscillator signal) is derived. Such a synthesizer may be implemented, for example, as a frequency multiplier or divider and may include a circuit such as a phase-locked loop (PLL).

A local oscillator signal may be supplied to a mixer of downconverter 322 as two components separated in phase by 90 degrees (e.g. I and Q), with each component being applied in a separate mixing path such that a complex downconverted signal is obtained. The amplitude of a local oscillator signal may be controlled, e.g. using a variable gain amplifier. The frequency reference signal (or a signal based on the frequency reference signal) may also be used as the sampling clock by which the ADC(s) sample the baseband (or near-baseband) signal.

Baseband processor 260 may perform an implementation of method M100 to provide sorted lists to microprocessor 220 for further processing (e.g. according to a best maximum peak test task and/or other tasks as described herein), although in another example, at least some further processing of the lists may be performed by baseband processor 260. Microprocessor 220, memory 230, and baseband processor 262 may be implemented on the same chip or may be distributed across different chips or even different devices.

Microprocessor 220 is configured to derive one or more time measurements (such as pseudoranges) from selected peaks. Microprocessor 220 may also be configured to determine an error (such as a root mean square error or RMSE) associated with a time measurement. Microprocessor 220 is configured to determine a location of device 202 based on selected peaks corresponding to several SVs.

Memory 230 may be configured to store instructions executed by baseband processor 260 and/or microprocessor 220 in performing a method as described or suggested herein. Memory 230 may also be configured to store instructions for other operations and/or to store intermediate results of such a method or operations. Microprocessor 220 may be configured to receive user commands and/or output results of such method and/or operations via user interface 210.

User interface 210 comprises a plurality of devices for inputting user commands and/or outputting positional information such as coordinates on a map and/or in latitude, longitude, and/or altitude. User interface 210 may include such devices as a keypad and/or keyboard and a display screen (e.g. a liquid crystal or organic LED display).

A receiving device according to an embodiment may be integrated into a communications device. Such a device may include one tuner configured to switch between frequencies for different tasks. In such a device, a signal sampled during a visit to the GPS frequency may be stored and processed after the tuner has tuned back to a communications (e.g. CDMA) frequency. Requirements of the communications network and/or of a desired operating performance may limit the maximum available tune-away time. Alternatively, such a device may include more than one tuner. For example, such a device may include a tuner dedicated to GPS reception and another tuner dedicated to other communications.

Figure 25:
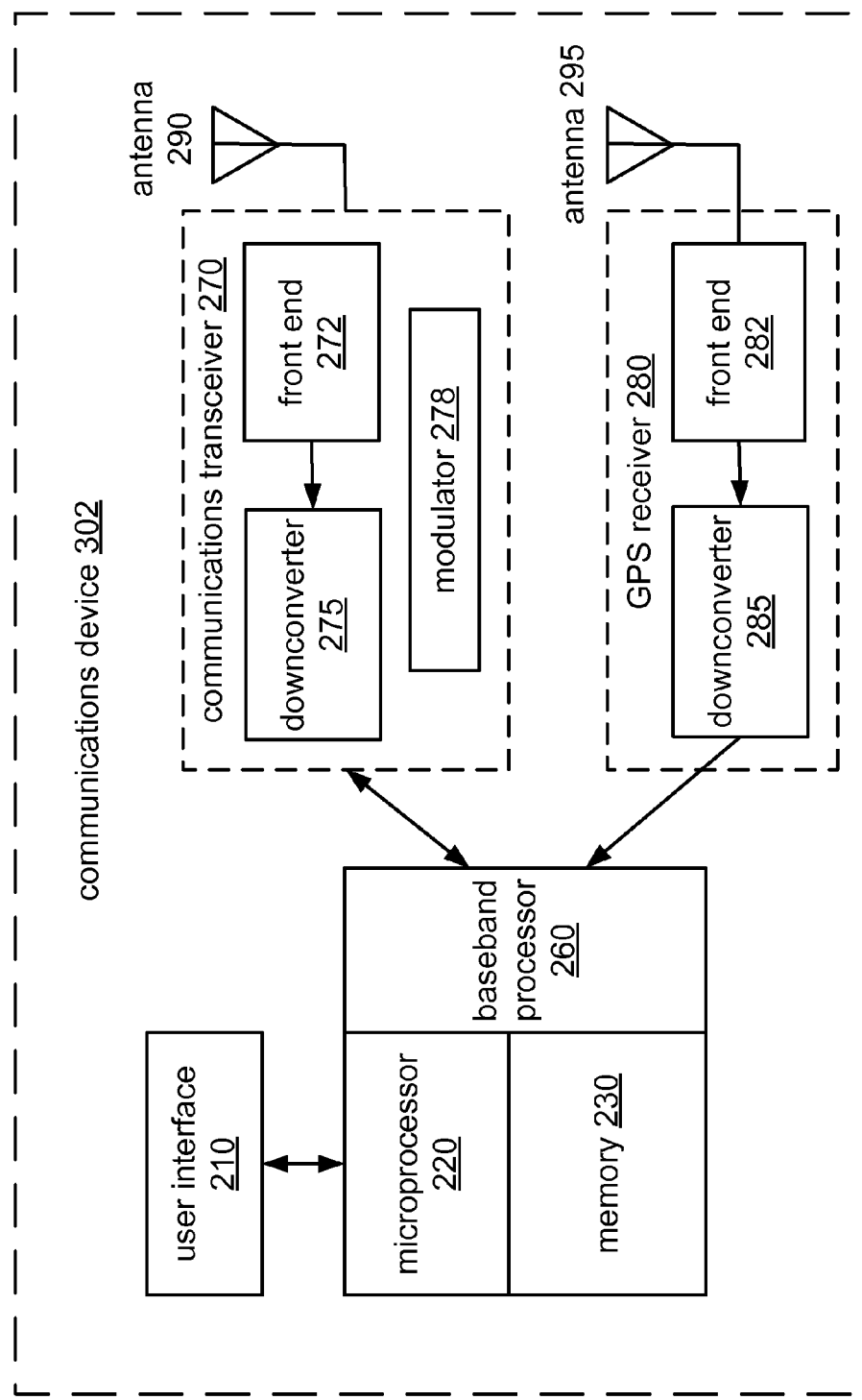
FIG. 25 is a block diagram of an implementation 302 of communications device 300.

FIG. 25 shows a block diagram of an implementation 302 of a communications device according to an embodiment. Such a device may include the elements of receiving device 202 as shown in FIG. 23, with one of more of such elements possibly including additional features or being otherwise modified. Communications device 302 also includes a communications transceiver 270 including a front end 272 (which may be implemented as shown in FIG. 24A and/or as discussed above), a downconverter 275 (which may be implemented as shown in FIG. 24B or 24C and/or as discussed above), and a modulator 278 configured to modulate information such as voice or data onto an RF carrier for transmission via antenna 290. Transceiver front end 272 is configured to receive a communications signal, such as a CDMA signal or other signal for communications with a network for cellular telephony, and may also include a duplexer to support receive and transmit activity over antenna 290. In some implementations of communications device 302, portions of a front end and/or downconverter may be common to the communications and GPS signal paths.

In this device, baseband processor 260 is configured to provide baseband information from microprocessor 220 to transceiver 270 for transmission over a wireless communications link. Microprocessor 220 in turn obtains this baseband information from an input device within user interface 210. Baseband processor 260 is also configured to provide baseband information from transceiver 270 to microprocessor 220. Microprocessor 220 in turn provides this baseband information to an output device within user interface 210. User interface 210 may be implemented to include one or more devices for inputting or outputting user information such as voice or data. Devices typically included within such a user interface include a keyboard, a display screen, a microphone, and a speaker.

Baseband processor 260 may also be configured to derive pilot-related correlation functions from information relating to pilot signals provided to it by communications transceiver 270. This information may be used by communications device 302 to acquire wireless communications services. Memory 230 may be configured to store such instructions and/or intermediate results as are involved in executing communications operations of communications device 302.

Information received via antenna 290 may include data to support modulation wipeoff, a listing of which SVs are currently visible and their approximate code phases and Dopplers, and a command to initiate an implementation of M100 or another method according to an embodiment. Microprocessor 220 may be configured to provide time measurements and errors to a PDE, which may be a network element such as a server connected to a computer network. In one example, the PDE weights each of the measurements based on the inverse of its corresponding RMSE value and estimates the position of communications device 302 based on the weighted measurements. The position calculated by the PDE may then be downloaded to device 302 so that it is available in case of a 911 or other emergency call. Other potential applications include user-requested location services, such as restaurant or ATM (automated teller machine) location, and push-oriented services such as position-dependent advertising. Communication between device 302 and a PDE may take place over a network for cellular communications.

A device according to an embodiment, such as an implementation of receiving device 202 or communications device 302, may be an independent unit (possibly including other elements for e.g. power management, user interface support, further processing of information received from a GPS or other receiver) or a portion of a device or system that also includes other circuits and/or functionalities. For example, such a device may be included in a transceiver that also includes a transmitter, e.g. an access terminal such as a cellular telephone (configured to communicate with a system including a network of base stations and including e.g. a microphone, speaker, keypad, and associated circuits and processing) and/or a wireless modem (configured to support data transfer between a wireless channel and e.g. a PCMCIA or USB port). Such a transceiver may communicate with one or more processors for configuring operations in the device, processing signals within the device, and/or controlling a user interface of the device that may include input devices (e.g. a microphone, a keyboard or keypad) and/or output devices (e.g. a speaker or audio output jack, a display screen).

Such a device may also be included in a device that supports further functionalities, e.g. including a media player (configured to decode audio information encoded into such compression formats as MP3, WMA, AAC3, and the like and/or video information encoded into such compression formats such as MPEG-2, MPEG-4, WMV, and the like), a personal digital assistant (PDA), a portable computer, etc. Such further functionalities may be integrated with the operations of a receiver and/or transmitter of the device: for example, playback of multimedia information received via the receiver; communication between applications executing locally (e.g. an e-mail client) and an external server via the wireless modem; synchronization of local and external schedules, contacts, or other databases via the wireless modem.

The foregoing presentation of the described embodiments is provided to enable any person skilled in the art to make or use the present invention. Various modifications to these embodiments are possible, and the generic principles presented herein may be applied to other embodiments as well.

The term "software" should be understood to include source code, assembly language code, machine code, binary code, firmware, macrocode, microcode, any one or more sets or sequences of instructions executable by an array of logic elements, and any combination of such examples.

It should be understood that a correlator as disclosed herein may be referred to as a means for correlating (e.g. a received code and a reference code), and that a processor or other array of logic elements as disclosed herein may be referred to as a means for processing (e.g. information received from storage and/or another circuit or array).

Embodiments may be implemented in part or in whole as a hard-wired circuit or as a circuit configuration fabricated into an application-specific integrated circuit. Embodiments may also be implemented in part or in whole as a firmware program loaded into non-volatile storage, or a software program loaded from or into storage such as a data storage medium (e.g. one or more arrays of data storage elements such as semiconductor or magnetic random-access memory (volatile or nonvolatile, integrated or removable); magnetic, optical, or phase-change disc media; etc.), as machine-readable code. Such code may include instructions executable by one or more arrays of logic elements such as microcontrollers, processors, microprocessors, digital signal processors (DSPs), or other processing units or finite state machines, whether such array or arrays are separate, integrated, and/or embedded. Thus, the present invention is not intended to be limited to the embodiments shown above but rather is to be accorded the widest scope consistent with the principles and novel features disclosed in any fashion herein.

What is claimed is:

1. A method of signal processing, said method comprising:
   obtaining a plurality of results from a correlator based on correlating a received code with a reference code, each result corresponding to one of a plurality of code phase hypotheses and one of a plurality of frequency hypotheses;
   for each of the plurality of the frequency hypotheses, selecting a plurality of peaks among the results for the frequency hypothesis; and
   selectively rejecting a frequency hypothesis, said rejecting being based on a relation between energy values of peaks in the plurality of peaks.

2. The method of signal processing according to claim 1, wherein said selecting a plurality of peaks includes selecting a plurality of peaks according to energy values of the peaks.

3. The method of signal processing according to claim 1, wherein said rejecting is based on a relation between (A) a noise floor and (B) an energy value of a peak in the plurality of peaks.

4. The method of signal processing according to claim 1, wherein said rejecting is based on a relation between (A) a noise floor and (B) an energy value of a peak having the greatest energy value in the plurality of peaks.

5. The method of signal processing according to claim 1, wherein said rejecting is based on a determination that an energy value of a peak in the plurality of peaks is within a threshold value of an energy value of another peak in the plurality of peaks.

6. The method of signal processing according to claim 1, wherein said rejecting is based on a determination that a difference between the energy values of two peaks in the plurality of peaks is not greater than a threshold value, wherein one of the two peaks is the peak having the greatest energy value in the plurality of peaks.

7. The method of signal processing according to claim 1, wherein said rejecting is based on a ratio of (A) an energy value of a peak in the plurality of peaks to (B) a noise value,
   wherein said noise value is based on values among the results for the frequency hypothesis, excluding those of the corresponding plurality of peaks.

8. The method of signal processing according to claim 1, wherein said rejecting includes:
   calculating a sum of the results for the frequency hypothesis;
   calculating a noise value for the frequency hypothesis, including subtracting a plurality of energy values from the sum; and
   comparing the number of subtracted energy values to a threshold.

9. The method of signal processing according to claim 1, said method comprising:
   selecting a peak in one of the pluralities of peaks; and calculating a pseudorange based on a code phase hypothesis corresponding to the selected peak.

10. The method of signal processing according to claim 9, said method comprising transmitting information based on the pseudorange to a network for wireless communications.

11. The method of signal processing according to claim 1, said method comprising:
   selecting a best maximum peak from one of the pluralities of peaks;
   selecting a peak from the plurality of peaks that corresponds to an earlier code hypothesis than the best maximum peak; and
   calculating a pseudorange based on the earlier code hypothesis.

12. The method of signal processing according to claim 1, wherein the received code is obtained from a signal received from a space vehicle of a global positioning system.

13. The method of signal processing according to claim 12, said method comprising rejecting a peak in one of the pluralities of peaks, said rejecting being based on a location in frequency of a signal received from another space vehicle of the global positioning system.

14. A non-transitory machine readable medium having machine-readable instructions which, when executed by a processing unit, perform operations, the instructions comprising:
   instructions to obtain a plurality of results from a correlator based on correlating a received code with a reference code, each result corresponding to one of a plurality of code phase hypotheses and one of a plurality of frequency hypotheses;
   instructions to select a plurality of peaks among the results for the frequency hypothesis for each of the plurality of the frequency hypotheses; and
   instructions to selectively reject a frequency hypothesis, said rejecting being based on a relation between energy values of peaks in the plurality of peaks.

15. An apparatus for signal processing, said apparatus comprising:
   a first array of logic elements configured to obtain a plurality of results based on correlating a received code with a reference code, each result corresponding to one of a plurality of code phase hypotheses and one of a plurality of frequency hypotheses;
   a second array of logic elements configured to select, for each of the plurality of the frequency hypotheses, a plurality of peaks among the results for the frequency hypothesis; and
   a third array of logic elements configured to determine, for a frequency hypothesis, a relation between energy values of peaks in the corresponding plurality of peaks and to selectively reject the frequency hypothesis based on the determined relation.

16. The apparatus for signal processing according to claim 15,
   wherein said first array includes a correlator.

17. The apparatus for signal processing according to claim 16, said apparatus comprising a searcher that includes the first array, said searcher comprising a plurality of correlators.

18. The apparatus for signal processing according to claim 15, said apparatus comprising a means for searching that includes the first array.

19. The apparatus for signal processing according to claim 15,
   wherein at least a portion of the first array and at least a portion of the second array are on the same device.

20. The apparatus for signal processing according to claim 15,
   wherein the apparatus is configured to transmit, over a wireless communications channel, information based on a code phase hypothesis corresponding to a peak in one of the pluralities of peaks.

21. The apparatus for signal processing according to claim 15,
   wherein the third array is configured to select a peak in one of the pluralities of peaks and to calculate a pseudorange based on a code phase hypothesis corresponding to the selected peak.

22. The apparatus for signal processing according to claim 15, said apparatus comprising a fourth array of logic elements configured to determine, for at least one of the frequency hypotheses, a relation between (A) a noise floor and (B) an energy value of a peak in the plurality of peaks and to reject the frequency hypothesis based on the determined relation.

23. An apparatus for signal processing, said apparatus comprising:
   a first array of logic elements configured to obtain a plurality of results based on correlating a received code with a reference code, each result corresponding to one of a plurality of code phase hypotheses and one of a plurality of frequency hypotheses; and
   a second array of logic elements configured to select, for each of the plurality of the frequency hypotheses, a plurality of peaks among the results for the frequency hypothesis,
   wherein the second array is configured to calculate, for each of the plurality of the frequency hypotheses, a noise value, and
   wherein each of said noise values is based on values among the results for the frequency hypothesis, excluding those of the corresponding plurality of peaks.

24. An apparatus for signal processing, said apparatus comprising:
   means for correlating a received code with a reference code to obtain a plurality of results, each result corresponding to one of a plurality of code phase hypotheses and one of a plurality of frequency hypotheses;
   means for selecting, for each of the plurality of the frequency hypotheses, a plurality of peaks obtained from the results for the frequency hypothesis; and
   means for determining, for at least one of the frequency hypotheses, a relation between energy values of peaks in the corresponding plurality of peaks and selectively rejecting the frequency hypothesis based on the determined relation.

25. The apparatus for signal processing according to claim 24,
   wherein the apparatus is configured to transmit, over a wireless communications channel, information based on a code phase hypothesis corresponding to a peak in one of the pluralities of peaks.

26. The apparatus for signal processing according to claim 24,
   wherein the means for determining is configured to select a peak in one of the pluralities of peaks and to calculate a pseudorange based on a code phase hypothesis corresponding to the selected peak.

27. The apparatus for signal processing according to claim 24, said apparatus further comprising means for determining, for at least one of the frequency hypotheses, a relation between (A) a noise floor and (B) an energy value of a peak in the plurality of peaks and to reject the frequency hypothesis based on the determined relation.

28. An apparatus for signal processing, said apparatus comprising:
 means for correlating a received code with a reference code to obtain a plurality of results, each result corresponding to one of a plurality of code phase hypotheses and one of a plurality of frequency hypotheses; and
 means for selecting, for each of the plurality of the frequency hypotheses, a plurality of peaks obtained from the results for the frequency hypothesis and calculating, for each of the plurality of the frequency hypotheses, a noise value,
 wherein each of said noise values is based on values among the results for the frequency hypothesis, excluding those of the corresponding plurality of peaks.

* * * * *